(12) United States Patent
Shirai et al.

(10) Patent No.: US 12,330,735 B2
(45) Date of Patent: Jun. 17, 2025

(54) CONTROL DEVICE FOR HUMAN-POWERED VEHICLE

(71) Applicant: SHIMANO INC., Sakai (JP)

(72) Inventors: Toyoto Shirai, Sakai (JP); Nobukatsu Hara, Sakai (JP); Yuki Sakagawa, Sakai (JP); Satoshi Shahana, Sakai (JP); Noor Ashyikkin Binti Mohd Noor, Sakai (JP)

(73) Assignee: SHIMANO INC., Sakai (JP)

( * ) Notice: Subject to any disclaimer, the term of this patent is extended or adjusted under 35 U.S.C. 154(b) by 232 days.

(21) Appl. No.: 17/829,270

(22) Filed: May 31, 2022

(65) Prior Publication Data

US 2023/0382482 A1   Nov. 30, 2023

(51) Int. Cl.
*B62J 6/24*   (2020.01)
*B62M 6/45*   (2010.01)
*B62M 25/08*  (2006.01)

(52) U.S. Cl.
CPC ............... *B62J 6/24* (2020.02); *B62M 6/45* (2013.01); *B62M 25/08* (2013.01)

(58) Field of Classification Search
CPC ... B62J 45/41; B62J 1/08; B62M 6/55; B62M 6/45; B62M 25/08; G08G 1/167; G06V 20/584; A61B 5/0002; A63B 69/16; B62K 15/00; F16H 55/30
See application file for complete search history.

(56) References Cited

U.S. PATENT DOCUMENTS

| | | | |
|---|---|---|---|
| 5,295,727 A * | 3/1994 | Kao | B62J 1/08 |
| | | | 297/215.14 |
| 10,192,437 B1 | 1/2019 | Sheynman et al. | |
| 11,009,364 B2 | 5/2021 | Bai et al. | |
| 2012/0035846 A1 | 2/2012 | Sakamoto et al. | |
| 2019/0009780 A1 * | 1/2019 | Komatsu | B62M 25/08 |
| 2019/0185099 A1 | 6/2019 | Shirai | |
| 2019/0206239 A1 * | 7/2019 | Guan | G06V 20/584 |
| 2019/0300109 A1 * | 10/2019 | Yamazaki | F16H 55/30 |
| 2019/0391582 A1 | 12/2019 | Jung | |
| 2020/0130777 A1 | 4/2020 | Yamazaki et al. | |
| 2022/0415178 A1 * | 12/2022 | Shibata | G08G 1/167 |
| 2023/0051464 A1 | 2/2023 | Weinmann et al. | |
| 2023/0202608 A1 * | 6/2023 | Stephens | B62M 6/55 |
| | | | 180/206.3 |

FOREIGN PATENT DOCUMENTS

| | | | | |
|---|---|---|---|---|
| CA | 3162488 A1 * | 10/2015 | ........... | A61B 5/0002 |
| CN | 101186225 B * | 3/2012 | ............. | B62K 15/00 |
| CN | 213473362 U * | 6/2021 | ............... | B62J 1/08 |
| DE | 102018219385 | 6/2019 | | |
| DE | 102019100732 A1 * | 8/2019 | ............... | B62J 1/08 |

(Continued)

*Primary Examiner* — Yuri Kan
(74) *Attorney, Agent, or Firm* — MORI & WARD, LLP

(57) ABSTRACT

A control device for a human-powered vehicle comprises an electronic controller configured to obtain driving-environment information relating to driving environment of the human-powered vehicle. The driving-environment information includes at least one of traffic information relating to traffic and road object information relating to road objects. The electronic controller is configured to control an electric component based on the driving-environment information.

29 Claims, 7 Drawing Sheets

(56) References Cited

FOREIGN PATENT DOCUMENTS

| | | | |
|---|---|---|---|
| DE | 102019117090 | 1/2020 | |
| DE | 102020200227 | 7/2021 | |
| EP | 0893338 A1 * | 1/1999 | .............. B62M 6/45 |
| EP | 3228499 A2 | 10/2017 | |
| JP | 5025851 B2 * | 12/2010 | .............. B62M 6/45 |
| WO | WO-2019059759 A1 * | 3/2019 | ......... A63B 21/0058 |

* cited by examiner

CONTROL DEVICE FOR HUMAN-POWERED VEHICLE

BACKGROUND

Technical Field

The present invention relates to a control device for a human-powered vehicle.

Background Information

A human-powered vehicle can be used in traffic infrastructure. Driving environment of the human-powered vehicle can be often changed in the traffic infrastructure. It is preferable to flexibly control a device of the human-powered vehicle depending on changes in the driving environment of the human-powered vehicle.

SUMMARY

In accordance with a first aspect of the present invention, a control device for a human-powered vehicle comprises an electronic controller configured to obtain driving-environment information relating to driving environment of the human-powered vehicle. The driving-environment information includes at least one of traffic information relating to traffic and road object information relating to road objects. The electronic controller is configured to control an electric component based on the driving-environment information.

With the control device according to the first aspect, it is possible to control the electric component based on the driving-environment information including at least one of the traffic information and the road object information. Thus, it is possible to flexibly control the electric component depending on changes in the driving environment of the human-powered vehicle.

In accordance with a second aspect of the present invention, the control device according to the first aspect is configured so that the electric component includes at least one of an informing unit, an assist driving unit, a gear-changing device, a braking device, a rider-posture changing device, and a light emitting device. The electronic controller is configured to control the at least one of the informing unit, the assist driving unit, the gear-changing device, the braking device, the rider-posture changing device, and the light emitting device based on the driving-environment information.

With the control device according to the second aspect, it is possible to flexibly control at least one of the informing unit, the assist driving unit, the gear-changing device, the braking device, the rider-posture changing device, and the light emitting device depending on changes in the driving environment of the human-powered vehicle.

In accordance with a third aspect of the present invention, the control device according to the first or second aspect is configured so that the electric component includes an informing unit configured to inform a user that the driving-environment information meets a condition. The electronic controller is configured to control the informing unit to inform the user that the driving-environment information meets the condition if the driving-environment information meets the condition.

With the control device according to the third aspect, it is possible to inform the user that the driving-environment information meets the condition using the informing unit.

In accordance with a fourth aspect of the present invention, the control device according to any one of the first to third aspects is configured so that the electric component includes an assist driving unit. The electronic controller is configured to control the assist driving unit to change an assist ratio if the traffic information is equal to or below a traffic-state threshold.

With the control device according to the fourth aspect, it is possible to flexibly control the assist driving unit depending on changes in the traffic.

In accordance with a fifth aspect of the present invention, the control device according to the fourth aspect is configured so that the electronic controller is configured to control the assist driving unit to decrease the assist ratio if the traffic information is equal to or below the traffic-state threshold.

With the control device according to the fifth aspect, it is possible to more flexibly control the assist driving unit depending on changes in the traffic.

In accordance with a sixth aspect of the present invention, the control device according to any one of the first to fifth aspects is configured so that the electric component includes an assist driving unit. The electronic controller is configured to control the assist driving unit to change an assist ratio if a road object distance defined from the control device to a road object which is included in the road object information and which is within a predetermined distance from the control device is equal to or below a road object threshold.

With the control device according to the sixth aspect, it is possible to flexibly control the assist driving unit depending on road object on roadways.

In accordance with a seventh aspect of the present invention, the control device according to the sixth aspect is configured so that the electronic controller is configured to control the assist driving unit to decrease the assist ratio if the road object distance is equal to or below the road object threshold.

With the control device according to the seventh aspect, it is possible to more flexibly control the assist driving unit depending on road object on roadways.

In accordance with an eighth aspect of the present invention, the control device according to any one of the first to seventh aspects is configured so that the electric component includes a gear-changing device. The electronic controller is configured to control the gear-changing device to change a gear ratio if the traffic information is equal to or below a traffic-state threshold.

With the control device according to the eighth aspect, it is possible to flexibly control the gear-changing device depending on changes in the traffic.

In accordance with a ninth aspect of the present invention, the control device according to the eighth aspect is configured so that the electronic controller is configured to control the gear-changing device to downshift if the traffic information is equal to or below the traffic-state threshold.

With the control device according to the ninth aspect, it is possible to more flexibly control the gear-changing device depending on changes in the traffic.

In accordance with a tenth aspect of the present invention, the control device according to any one of the first to ninth aspects is configured so that the electric component includes a gear-changing device. The electronic controller is configured to control the gear-changing device to change a gear ratio if a road object distance defined from the control device to a road object which is included in the road object information and which is within a predetermined distance from the control device is equal to or below a road object threshold.

With the control device according to the tenth aspect, it is possible to flexibly control the gear-changing device depending on road objects on roadways.

In accordance with an eleventh aspect of the present invention, the control device according to the tenth aspect is configured so that the electronic controller is configured to control the gear-changing device to downshift if the road object distance is equal to or below the road object threshold.

With the control device according to the eleventh aspect, it is possible to more flexibly control the gear-changing device depending on road objects on roadways.

In accordance with a twelfth aspect of the present invention, the control device according to any one of the first to eleventh aspects is configured so that the electric component includes a braking device. The electronic controller is configured to control the braking device to change braking force if the traffic information is equal to or below a traffic-state threshold.

With the control device according to the twelfth aspect, it is possible to flexibly control the braking device depending on changes in the traffic.

In accordance with a thirteenth aspect of the present invention, the control device according to the twelfth aspect is configured so that the electronic controller is configured to control the braking device to increase the braking force if the traffic information is equal to or below the traffic-state threshold.

With the control device according to the thirteenth aspect, it is possible to more flexibly control the braking device depending on changes in the traffic.

In accordance with a fourteenth aspect of the present invention, the control device according to any one of the first to thirteenth aspects is configured so that the electric component includes a braking device. The electronic controller is configured to control the braking device to change braking force if a road object distance defined from the control device to a road object which is included in the road object information and which is within a predetermined distance from the control device is equal to or below a road object threshold.

With the control device according to the fourteenth aspect, it is possible to flexibly control the braking device depending on changes in road objects in roadways.

In accordance with a fifteenth aspect of the present invention, the control device according to the fourteenth aspect is configured so that the electronic controller is configured to control the braking device to increase the braking force if the road object distance is equal to or below the road object threshold.

With the control device according to the fifteenth aspect, it is possible to more flexibly control the braking device depending on changes in road objects in roadways.

In accordance with a sixteenth aspect of the present invention, the control device according to any one of the first to fifteenth aspects is configured so that the electric component includes a rider-posture changing device. The electronic controller is configured to control the rider-posture changing device to change a state of the rider-posture changing device if the traffic information is equal to or below a traffic-state threshold.

With the control device according to the sixteenth aspect, it is possible to flexibly control the rider-posture changing device depending on changes in the traffic.

In accordance with a seventeenth aspect of the present invention, the control device according to the sixteenth aspect is configured so that the electronic controller is configured to control the rider-posture changing device to change the state of the rider-posture changing device to a predetermined state if the traffic information is equal to or below the traffic-state threshold.

With the control device according to the seventeenth aspect, it is possible to more flexibly control the rider-posture changing device depending on changes in the traffic.

In accordance with an eighteenth aspect of the present invention, the control device according to any one of the first to seventeenth aspects is configured so that the electric component includes a rider-posture changing device. The electronic controller is configured to control the rider-posture changing device to change a state of the rider-posture changing device if a road object distance defined from the control device to a road object which is included in the road object information and which is within a predetermined distance from the control device is equal to or below a road object threshold.

With the control device according to the eighteenth aspect, it is possible to flexibly control the rider-posture changing device depending on changes in road objects in roadways.

In accordance with a nineteenth aspect of the present invention, the control device according to the eighteenth aspect is configured so that the electronic controller is configured to control the rider-posture changing device to change the state of the rider-posture changing device to a predetermined state if the road object distance is equal to or below the road object threshold.

With the control device according to the nineteenth aspect, it is possible to more flexibly control the rider-posture changing device depending on changes in road objects in roadways.

In accordance with a twentieth aspect of the present invention, the control device according to any one of the first to nineteenth aspects is configured so that the electric component includes a light emitting device. The electronic controller is configured to control the light emitting device to change a state of the light emitting device if a road object distance defined from the control device to a road object which is included in the road object information and which is within a predetermined distance from the control device is equal to or below a road object threshold.

With the control device according to the twentieth aspect, it is possible to flexibly control the light emitting device depending on changes in road objects in roadways.

In accordance with a twenty-first aspect of the present invention, the control device according to the twentieth aspect is configured so that the electronic controller is configured to control the light emitting device to change the state of the light emitting device to a predetermined state if the road object distance is equal to or below the road object threshold.

With the control device according to the twenty-first aspect, it is possible to more flexibly control the light emitting device depending on changes in road objects in roadways.

In accordance with a twenty-second aspect of the present invention, the control device according to any one of the first to twenty-first aspects is configured so that the electronic controller is configured to obtain the driving-environment information from an external device.

With the control device according to the twenty-second aspect, it is possible to obtain the driving-environment information over a wide area using the external device.

In accordance with a twenty-third aspect of the present invention, the control device according to any one of the first to twenty-second aspects is configured so that the traffic information includes at least one of vehicular traffic data, motorcycle traffic data, human-powered vehicle traffic data, pedestrian traffic data, road surface condition data, and occurrence data.

With the control device according to the twenty-third aspect, it is possible to utilize at least one of the vehicular traffic data, the motorcycle traffic data, the human-powered vehicle traffic data, the pedestrian traffic data, the road surface condition data, and the occurrence data to control the electric component of the human-powered vehicle.

In accordance with a twenty-fourth aspect of the present invention, the control device according to the twenty-third aspect is configured so that the occurrence data includes physical contact data relating to physical contacts between entities selected from among at least two of vehicles, motorcycles, human-powered vehicles, pedestrians, and road objects.

With the control device according to the twenty-fourth aspect, it is possible to flexibly control the electric component depending on the physical contact data.

In accordance with a twenty-fifth aspect of the present invention, the control device according to any one of the first to twenty-fourth aspects is configured so that the traffic information includes past and present traffic data obtained from a traffic infrastructure system.

With the control device according to the twenty-fifth aspect, it is possible to more flexibly control the electric component using the past and present traffic data.

In accordance with a twenty-sixth aspect of the present invention, the control device according to any one of the first to twenty-fifth aspects is configured so that the road object information relates to at least one of non-living objects which are on roadways and living objects put which are on roadways.

With the control device according to the twenty-sixth aspect, it is possible to more flexibly control the electric component depending on changes in at least one of the non-living objects and the living object put on roadways.

In accordance with a twenty-seventh aspect of the present invention, the control device according to any one of the first to twenty-sixth aspects further comprises a detector. The electronic controller is configured to obtain the driving-environment information based on a detection result of the detector.

With the control device according to the twenty-seventh aspect, it is possible to improve accuracy of the driving-environment information using the detection result of the detector.

In accordance with a twenty-eighth aspect of the present invention, an electronic controller is configured to obtain driving-environment information relating to driving environment of the human-powered vehicle. The driving-environment information includes at least one of traffic information relating to traffic and road object information relating to road objects. The electronic controller is configured to control an electric component based on the driving-environment information.

With the electronic controller according to the twenty-eighth aspect, it is possible to control the electric component based on the driving-environment information including at least one of the traffic information and the road object information. Thus, it is possible to flexibly control the electric component depending on changes in the driving environment of the human-powered vehicle.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
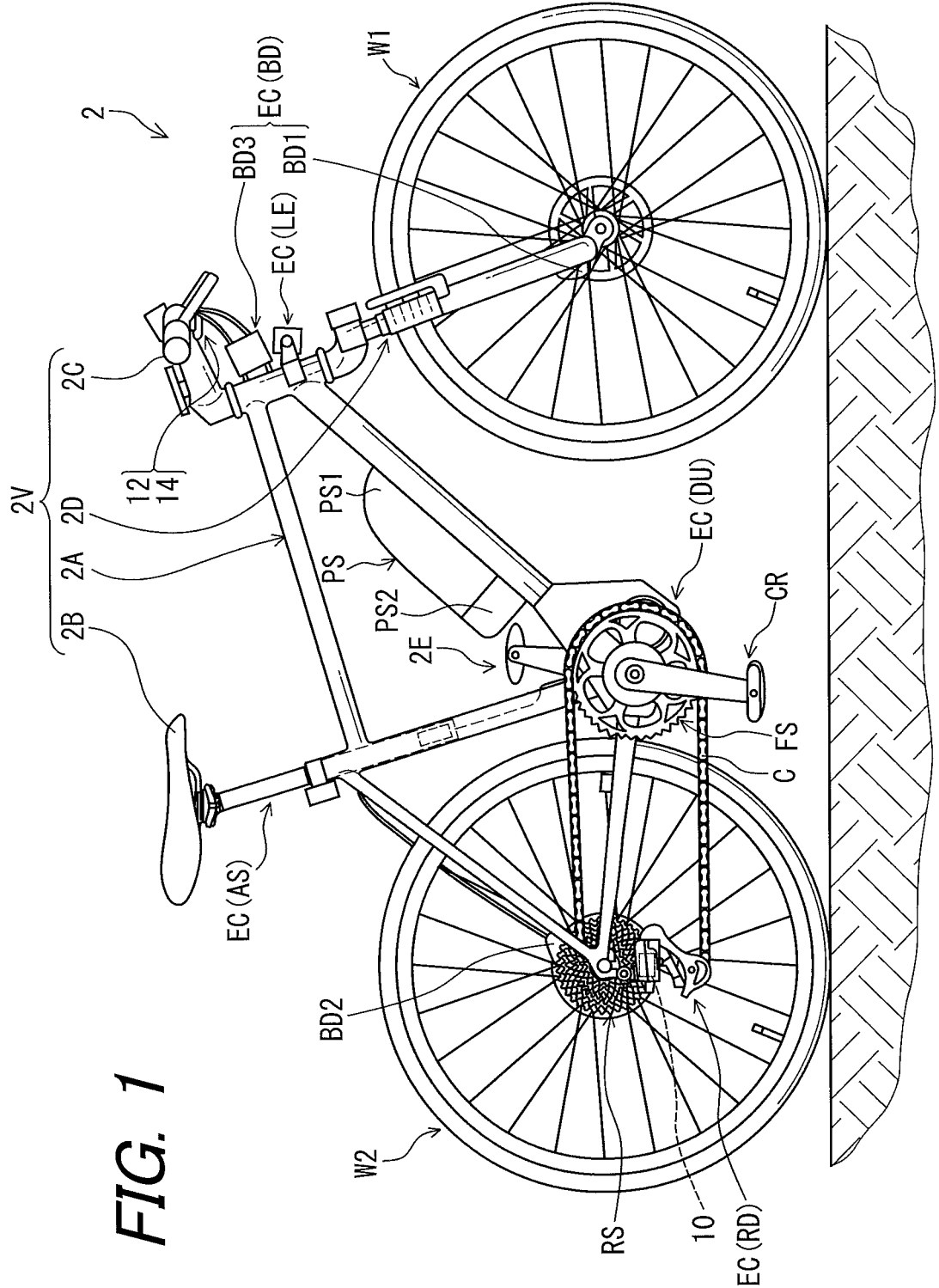
FIG. 1 is a side elevational view of a human-powered vehicle including a control device in accordance with an embodiment.

The embodiment(s) will now be described with reference to the accompanying drawings, wherein like reference numerals designate corresponding or identical elements throughout the various drawings.

As seen in FIG. 1, a human-powered vehicle 2 includes a control device 10 in accordance with an embodiment. The human-powered vehicle 2 includes a vehicle body 2V, a drive train 2E, a wheel W1, and a wheel W2. The vehicle body 2V includes a frame 2A, a seat 2B, a handlebar 2C, and a front fork 2D. The front fork 2D is rotatably coupled to the frame 2A. The handlebar 2C is secured to the front fork 2D. The wheel W1 is rotatably coupled to the front fork 2D. The wheel W2 is rotatably coupled to the frame 2A.

In the present application, a human-powered vehicle is a vehicle to travel with a motive power including at least a human power of a user who rides the human-powered vehicle (i.e., rider). The human-powered vehicle includes a various kind of bicycles such as a mountain bike, a road bike, a city bike, a cargo bike, a hand bike, and a recumbent bike. Furthermore, the human-powered vehicle includes an electric bike (E-bike). The electric bike includes an electrically assisted bicycle configured to assist propulsion of a vehicle with an electric motor. However, a total number of wheels of the human-powered vehicle is not limited to two. For example, the human-powered vehicle includes a vehicle having one wheel or three or more wheels. Especially, the human-powered vehicle does not include a vehicle that uses only an internal-combustion engine as motive power. Generally, a light road vehicle, which includes a vehicle that does not require a driver's license for a public road, is assumed as the human-powered vehicle.

In the present application, the following directional terms "front," "rear," "forward," "rearward," "left," "right," "transverse," "upward" and "downward" as well as any other similar directional terms refer to those directions which are determined on the basis of a user (e.g., a rider) who is in the user's standard position (e.g., on the seat 2B such as a saddle) in the human-powered vehicle 2 with facing the handlebar 2C or a steering. Accordingly, these terms, as utilized to describe the control device 10 or other components, should be interpreted relative to the human-powered vehicle 2 equipped with the control device 10 or other components as used in an upright riding position on a horizontal surface.

The drive train 2E includes a crank CR, a sprocket assembly FS, a sprocket assembly RS, and a chain C. The sprocket assembly FS is coupled to the crank CR to rotate relative to the vehicle body 2V along with the crank CR. The sprocket assembly RS is rotatably coupled to the vehicle body 2V along with the wheel W2. The sprocket assembly FS includes a single sprocket. The sprocket assembly RS includes at least two sprockets. The sprocket assemblies FS and RS define at least two gear positions. The chain C is engaged with the sprocket assembly FS and the sprocket assembly RS. The sprocket assembly FS can include at least two sprockets if needed and/or desired.

The human-powered vehicle 2 includes an electric component EC. The electric component EC includes at least one of an informing unit, an assist driving unit, a gear-changing device, a braking device, a rider-posture changing device, and a light emitting device. In the present embodiment, the electric component EC includes an informing unit IU. The electric component EC includes an assist driving unit DU. The electric component EC includes a gear-changing device RD. The electric component EC includes a braking device BD. The electric component EC includes a rider-posture changing device AS. The electric component EC includes a light emitting device LE. However, at least one of the informing unit IU, the assist driving unit DU, the gear-changing device RD, the braking device BD, the rider-posture changing device AS, and the light emitting device LE can be omitted from the electric component EC if needed and/or desired. The electric component EC can include another device other than the informing unit IU, the assist driving unit DU, the gear-changing device RD, the braking device BD, the rider-posture changing device AS, and the light emitting device LE if needed and/or desired.

The informing unit IU is mounted to the vehicle body 2V. The informing unit IU is configured to inform the user of vehicle information relating to the human-powered vehicle 2. The informing unit IU includes at least one of a light emitter, a loudspeaker, a vibrator, a cyclocomputer, a smartphone, a smartwatch, and a tablet computer.

The assist driving unit DU is mounted to the vehicle body 2V. The assist driving unit DU is configured to assist propulsion of the human-powered vehicle 2. For example, the assist driving unit DU is configured to apply assist force to the drive train 2E. The assist driving unit DU is configured to control the assist force based on pedaling force applied to the crank CR and a user operation of the operating device 14. The assist driving unit DU can be configured to apply assist force to parts (e.g., the wheel W1, the wheel W2) other than the drive train 2E if needed and/or desired.

The gear-changing device RD is mounted to the vehicle body 2V. The gear-changing device RD is configured to shift the chain C relative to the sprocket assembly RS in response to a user operation of the operating device 12. In the present embodiment, the gear-changing device RD is a rear derailleur. However, the electric component EC can include a gear-changing device provided as a front derailleur if needed and/or desired.

The rider-posture changing device AS is mounted to the vehicle body 2V. The rider-posture changing device AS is configured to change a state of the rider-posture changing device AS between a lock state and an adjustable state in response to a user operation of the operating device 14. The rider-posture changing device AS allows the user to change a position of the seat 2B relative to the frame 2A in the adjustable state. The rider-posture changing device AS fixedly positions the seat 2B relative to the frame 2A in the lock state. The rider-posture changing device AS can also be referred to as an adjustable seatpost AS. However, the electric component EC can include a rider-posture changing device provided as a suspension or an adjustable stein if needed and/or desired. The suspension is provided to the front fork 2D to absorb and/or damp impact and/or vibration from a road surface. The adjustable stem couples the handlebar 2C and the front fork 2D and is configured to change a position of the handlebar 2C relative to the front fork 2D.

The light emitting device LE is mounted to the vehicle body 2V. The light emitting device LE is configured to emit light. The light emitting device LE includes a light emitter such as a light emitting diode (LED).

The human-powered vehicle 2 includes operating devices 12 and 14. The operating devices 12 and 14 are mounted to the vehicle body 2V. The operating devices 12 and 14 are mounted to the handlebar 2C of the vehicle body 2V.

The operating device 12 is configured to receive a user operation to operate the gear-changing device RD. The operating device 12 is configured to receive a user operation to operate the assist driving unit DU.

The operating device 14 is configured to receive a user operation to operate the rider-posture changing device AS. The operating device 14 is configured to receive a user operation to operate the light emitting device LE.

As seen in FIG. 1, the braking device BD is mounted to the vehicle body 2V. The braking device BD is configured to apply braking force to the wheels W1 and W2. The braking device BD includes a brake caliper BD1 and a brake caliper BD2. The brake caliper BD1 is configured to apply braking force to the wheel W1 in response to the user operation of the operating device 12. The brake caliper BD2 is configured to apply braking force to the wheel W2 in response to the user operation of the operating device 14. Thus, the braking device BD is configured to be manually operated using the operating device 12.

For example, the brake caliper BD1 includes a hydraulic brake caliper. The brake caliper BD1 is configured to apply the braking force to the wheel W1 in response to a hydraulic pressure supplied from the operating device 12. The brake caliper BD2 includes a hydraulic brake caliper. The brake caliper BD2 is configured to apply the braking force to the wheel W2 in response to a hydraulic pressure supplied from the operating device 14. At least one of the brake calipers BD1 and BD2 can be configured to be operated by other structures such as a mechanical cable if needed and/or desired.

Figure 2:
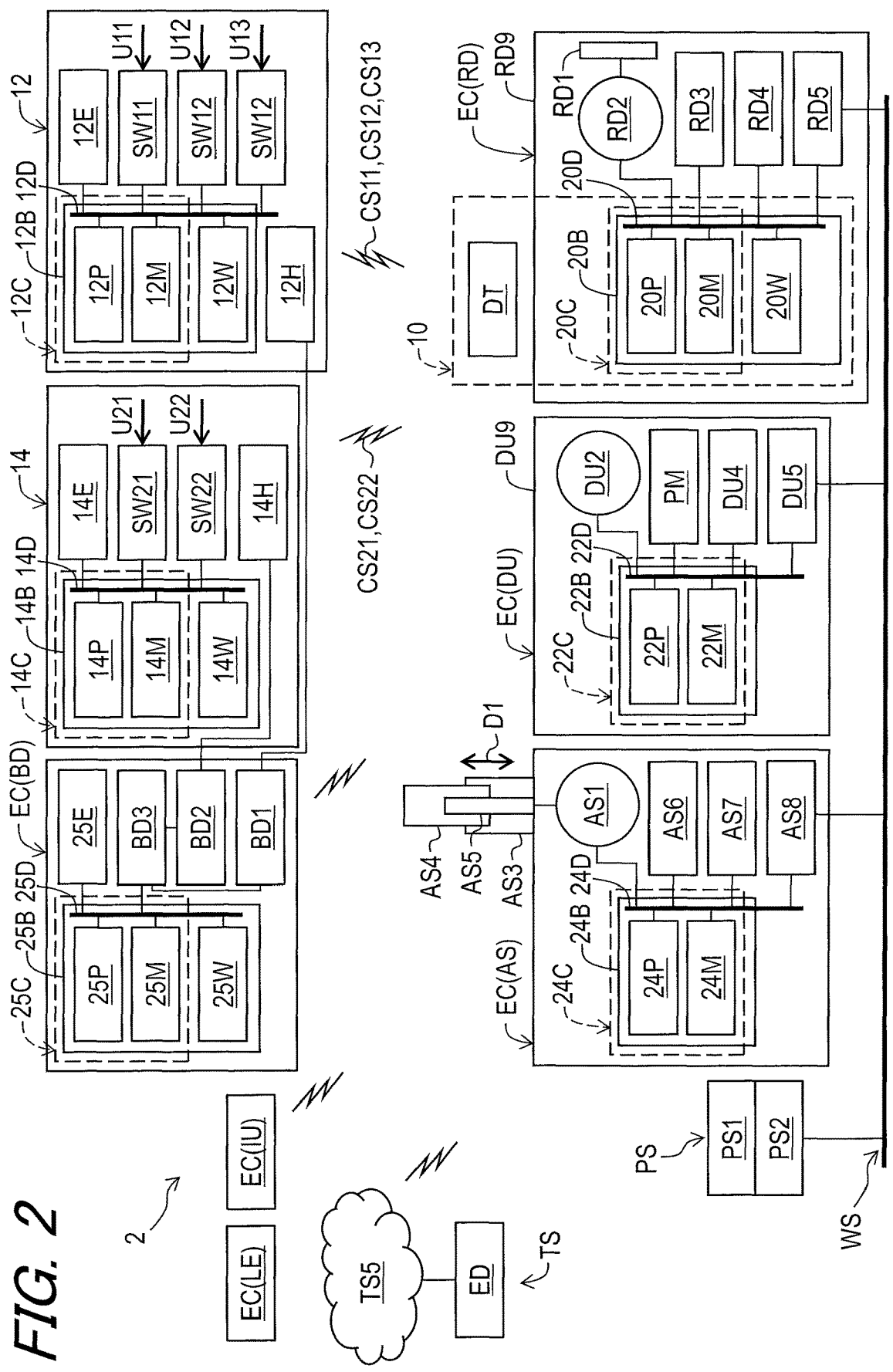
FIGS. 2 to 4 are schematic block diagrams of the human-powered vehicle illustrated in FIG. 1, with a traffic infrastructure system.

As seen in FIG. 2, the operating device 12 includes a brake operating unit 12H. The brake operating unit 12H is configured to operate the brake caliper BD1 in response to a user operation (e.g., a movement of a lever). The brake operating unit 12H includes a hydraulic unit connected to the brake caliper BD1 via a hydraulic hose. However, the brake operating unit 12H can include structures (e.g., a cable taking-up structure) other than the hydraulic unit if needed and/or desired.

The operating device 14 includes a brake operating unit 14H. The brake operating unit 14H is configured to operate the brake caliper BD2 in response to a user operation (e.g., a movement of a lever). The brake operating unit 14H includes a hydraulic unit connected to the brake caliper BD2 via a hydraulic hose. However, the brake operating unit 14H can include structures (e.g., a cable taking-up structure) other than the hydraulic unit if needed and/or desired.

As seen in FIG. 2, the human-powered vehicle 2 comprises an electric power source PS. The electric power source PS is configured to supply electricity to the assist driving unit DU, the gear-changing device RD, and the rider-posture changing device AS. The electric power source PS includes a battery PS1 and a battery holder PS2. The battery holder PS2 is coupled to the vehicle body 2V. The battery holder PS2 is configured to detachably and reattachably hold the battery PS1. Examples of the battery PS1 include a primary battery and a secondary battery. The electric power source PS can be at least partially provided in the vehicle body 2V if needed and/or desired.

The term "detachably and reattachably," as used herein, encompasses a configuration in which an element is repeatedly detachable from and attachable to another element without substantial damage.

The human-powered vehicle 2 includes a wired communication structure WS. The electric power source PS is electrically connected to the assist driving unit DU, the gear-changing device RD, and the rider-posture changing device AS via the wired communication structure WS to supply electricity to the assist driving unit DU, the gear-changing device RD, and the rider-posture changing device AS. For example, the wired communication structure WS includes at least one electric cable.

The battery holder PS2 is configured to be electrically connected to the assist driving unit DU, the gear-changing device RD, and the rider-posture changing device AS via the wired communication structure WS. The battery PS1 is configured to supply electricity to the assist driving unit DU, the gear-changing device RD, and the rider-posture changing device AS via the battery holder PS2 and the wired communication structure WS.

In the present embodiment, the electric power source PS, the assist driving unit DU, the gear-changing device RD, and the rider-posture changing device AS are configured to communicate with each other through a voltage line using power line communication (PLC) technology. The PLC is used for communicating between electrical components. The PLC carries data on a conductor that is also used simultaneously for electric power transmission or electric power distribution to the electrical component. In the present embodiment, the electric power is supplied from the electric power source PS to the assist driving unit DU, the gear-changing device RD, and the rider-posture changing device AS through the wired communication structure WS. Furthermore, the electric power source PS, the assist driving unit DU, the gear-changing device RD, and the rider-posture changing device AS are configured to receive information signals from each other through the wired communication structure WS using the PLC.

The PLC uses unique identifying information such as a unique identifier that is assigned to each of electrical components. Each of the electric power source PS, the assist driving unit DU, the gear-changing device RD, and the rider-posture changing device AS is configured to store the unique identifying information. Based on the unique identifying information, the electric power source PS, the assist driving unit DU, the gear-changing device RD, and the rider-posture changing device AS can recognize, based on the unique identifying information, information signals which are necessary for itself among information signals transmitted via the wired communication structure WS. For example, the electric power source PS, the assist driving unit DU, the gear-changing device RD, and the rider-posture changing device AS can recognize information signals transmitted from the electric power source PS, the assist driving unit DU, the gear-changing device RD, and the rider-posture changing device AS through the wired communication structure WS. Instead of using the PLC technology, however, separate signal wires can be provided for transmitting data in addition to the ground wire and the voltage wire if needed and/or desired. At least one of the electric power source PS, the assist driving unit DU, the gear-changing device RD, and the rider-posture changing device AS can be configured to wirelessly communicate with another of the electric power source PS, the assist driving unit DU, the gear-changing device RD, and the rider-posture changing device AS if needed and/or desired.

As seen in FIG. 2, the operating device 12 is configured to generate a control signal CS11 in response to a user input U11. The operating device 12 is configured to generate a control signal CS12 in response to a user input U12. The operating device 12 is configured to generate a control signal CS13 in response to a user input U13.

The operating device 14 is configured to generate a control signal CS21 in response to a user input U21. The operating device 14 is configured to generate a control signal CS22 in response to a user input U22.

For example, the control signal CS11 indicates upshifting of the gear-changing device RD. The control signal CS12 indicates downshifting of the gear-changing device RD. The control signal CS13 indicates changing an applied assist ratio of the assist driving unit DU. The control signal CS21 indicates changing a state of the rider-posture changing device AS. The control signal CS22 indicates changing a state of the light emitting device LE. However, at least one of the control signals CS11, CS12, CS13, CS21, and CS22 can indicate other actions.

In the present embodiment, the operating device 12 is configured to wirelessly transmit the control signal CS11 in response to the user input U11. The operating device 12 is configured to wirelessly transmit the control signal CS12 in response to the user input U12. The operating device 12 is configured to wirelessly transmit the control signal CS13 in response to the user input U13. The operating device 14 is configured to wirelessly transmit the control signal CS21 in response to the user input U21. The operating device 14 is configured to wirelessly transmit the control signal CS22 in response to the user input U22.

However, the operating device 12 can be configured to transmit the control signal CS11 in response to the user input U11 via the wired communication structure WS if needed and/or desired. The operating device 12 can be configured to transmit the control signal CS12 in response to the user input U12 via the wired communication structure WS if needed and/or desired. The operating device 12 can be configured to transmit the control signal CS13 in response to the user input U13 via the wired communication structure WS if needed and/or desired. The operating device 14 can be configured to transmit the control signal CS21 in response to the user input U21 via the wired communication structure WS if needed and/or desired. The operating device 14 can be configured to transmit the control signal CS22 in response to the user input U22 via the wired communication structure WS if needed and/or desired.

As seen in FIG. 2, the operating device 12 includes an electric switch SW11, an electric switch SW12, an electric switch SW13, a communicator 12W, and an electronic controller 12C. The electric switch SW11 is configured to receive the user input U11 and is configured to be activated in response to the user input U11. The electric switch SW12 is configured to receive the user input U12 and is configured to be activated in response to the user input U12. The electric switch SW13 is configured to receive the user input U13 and is configured to be activated in response to the user input U13.

The communicator 12W is configured to communicate with another communicator of another device via wired or wireless communication. In the present embodiment, the communicator 12W is configured to wirelessly communicate with another communicator of another device. However, the communicator 12W can be configured to communicate with another communicator of another device via wired communication if needed and/or desired.

The electronic controller 12C is electrically connected to the communicator 12W to control the communicator 12W. The electronic controller 12C is configured to control the communicator 12W to wirelessly transmit the control signal CS11 in response to the user input U11 received by the electric switch SW11. The electronic controller 12C is configured to control the communicator 12W to wirelessly transmit the control signal CS12 in response to the user input U12 received by the electric switch SW12. The electronic controller 12C is configured to control the communicator 12W to wirelessly transmit the control signal CS13 in response to the user input U13 received by the electric switch SW12.

The electronic controller 12C includes a computer processor 12P, a computer memory 12M, a circuit board 12B, and a bus 12D. The computer processor 12P and the computer memory 12M are electrically mounted on the circuit board 12B. The computer processor 12P is electrically connected to the computer memory 12M via the circuit board 12B and the bus 12D. The circuit board 12B can include at least two separate circuit boards if needed and/or desired.

For example, the computer processor 12P includes at least one of a central processing unit (CPU), a micro processing unit (MPU), and a memory controller. The computer memory 12M is electrically connected to the computer processor 12P. For example, the computer memory 12M includes at least one of a volatile memory and a non-volatile memory. Examples of the volatile memory include a random-access memory (RAM) and a dynamic random-access memory (DRAM). Examples of the non-volatile memory include a read only memory (ROM) and an electrically erasable programmable ROM (EEPROM). The computer memory 12M includes storage areas each having an address in the ROM and the RAM. The computer processor 12P is configured to control the computer memory 12M to store data in the storage areas of the computer memory 12M and reads data from the storage areas of the computer memory 12M. The computer processor 12P can also be referred to as a hardware processor 12P. The computer memory 12M can also be referred to as a hardware memory 12M. The computer memory 12M can also be referred to as a computer-readable storage medium 12M.

The electronic controller 12C is programed to execute at least one control algorithm of the operating device 12. The computer memory 12M is configured to store at least one program including at least one program instructions. The at least one program is read into the computer processor 12P, and thereby the at least one control algorithm of the operating device 12 is executed based on the at least one program. The electronic controller 12C can also be referred to as an electronic control circuit or circuitry 12C. The electronic controller 12C can also be referred to as an operating hardware electronic controller 12C.

The structure of the electronic controller 12C is not limited to the above structure. The structure of the electronic controller 12C is not limited to the computer processor 12P, the computer memory 12M, the circuit board 12B, and the bus 12D. The electronic controller 12C can be realized by hardware alone or a combination of hardware and software. The computer processor 12P and the computer memory 12M can be integrated as one chip such as an application specific integrated circuit (ASIC) or a field programmable gate array (FPGA).

The communicator 12W includes a signal generating circuit, a signal transmitting circuit, a signal receiving circuit, and an antenna. The signal generating circuit is configured to generate wireless signals (e.g., the control signals CS11, CS12, and CS13) based on each of the user inputs U11, U12, and U13 received by the electric switches SW11, SW12, and SW13 of the operating device 12. The signal generating circuit is configured to superimpose digital signals on carrier wave using a predetermined wireless communication protocol to generate the wireless signals. The signal transmitting circuit is configured to transmit the wireless signal via the antenna in response to the electric signal which is input from each of the electric switches SW11, SW12, and SW13. In the present embodiment, the signal generating circuit is configured to encrypt control information to generate encrypted wireless signals. The signal generating circuit is configured to encrypt digital signals stored in the computer memory 12M using a cryptographic key. The signal transmitting circuit is configured to transmit the encrypted wireless signals. Thus, the operating device 12 is configured to wirelessly transmit the wireless signal to establish secured wireless communication.

Furthermore, the signal receiving circuit is configured to receive wireless signals from another wireless communicator via the antenna. In the present embodiment, the signal receiving circuit is configured to decode the wireless signal to recognize information wirelessly transmitted from another wireless communicator. The signal receiving circuit is configured to decrypt the encrypted wireless signal using the cryptographic key. Namely, the operating device 12 is configured to transmit a wireless signal to control an electric device and to receive a wireless signal to recognize information from the electric device. In other words, the operating device 12 is provided as a wireless transmitter and a wireless receiver. In the present embodiment, the operating device 12 is integrally provided as a single unit. However, the operating device 12 can be constituted of a wireless transmitter and a wireless receiver which are provided as separate units arranged at different positions from each other.

The operating device 12 includes an electric power source 12E. The electric power source 12E is configured to supply electricity. The electric power source 12E is electrically connected to the communicator 12W and the electronic controller 12C to supply electricity to the communicator 12W and the electronic controller 12C. The electric power source 12E includes a battery and a battery holder. The battery holder is configured to detachably and reattachably hold the battery. The battery holder is electrically mounted on the circuit board 12B. The battery holder is electrically connected to the communicator 12W and the electronic controller 12C. In a case where the operating device 12 is electrically connected to the electric power source PS via the wired communication structure WS, the electric power source 12E can be omitted from the operating device 12.

The operating device 12 includes at least one of a battery holder and a circuit board. In the present embodiment, the operating device 12 includes the battery holder. The operating device 12 includes the circuit board 12B. However, at least one of the battery holder and the circuit board 12B can be omitted from the operating device 12 if needed and/or desired.

The circuit board 12B is configured to be electrically connected to at least one of the electric switch SW11, SW12, and SW13, the communicator 12W, and the electric power source 12E. In the present embodiment, the circuit board 12B is configured to be electrically connected to the electric switches SW11, SW12, and SW13, the communicator 12W, and the electric power source 12E. However, the circuit board 12B can be configured to be electrically connected to at least one of the electric switches SW11, SW12, and SW13, the communicator 12W, and the electric power source 12E if needed and/or desired.

As seen in FIG. 2, the operating device 14 includes an electric switch SW21, an electric switch SW22, a communicator 14W, and an electronic controller 14C. The electric switch SW21 is configured to receive the user input U21 and is configured to be activated in response to the user input U21. The electric switch SW22 is configured to receive the user input U22 and is configured to be activated in response to the user input U22.

The communicator 14W is configured to communicate with another communicator of another device via wired or wireless communication. In the present embodiment, the communicator 14W is configured to wirelessly communicate with another communicator of another device. However, the communicator 14W can be configured to communicate with another communicator of another device via wired communication if needed and/or desired.

The electronic controller 14C is electrically connected to the communicator 14W to control the communicator 14W. The electronic controller 14C is configured to control the communicator 14W to wirelessly transmit the control signal CS21 in response to the user input U21 received by the electric switch SW21. The electronic controller 14C is configured to control the communicator 14W to wirelessly transmit the control signal CS22 in response to the user input U22 received by the electric switch SW22.

The electronic controller 14C includes a computer processor 14P, a computer memory 14M, a circuit board 14B, and a bus 14D. The computer processor 14P and the computer memory 14M are electrically mounted on the circuit board 14B. The computer processor 14P is electrically connected to the computer memory 14M via the circuit board 14B and the bus 14D. The circuit board 14B can include at least two separate circuit boards if needed and/or desired.

For example, the computer processor 14P includes at least one of a CPU, a MPU, and a memory controller. The computer memory 14M is electrically connected to the computer processor 14P. For example, the computer memory 14M includes at least one of a volatile memory and a non-volatile memory. Examples of the volatile memory include a RAM and a DRAM. Examples of the non-volatile memory include a ROM and an EEPROM. The computer memory 14M includes storage areas each having an address in the ROM and the RAM. The computer processor 14P is configured to control the computer memory 14M to store data in the storage areas of the computer memory 14M and reads data from the storage areas of the computer memory 14M. The computer processor 14P can also be referred to as a hardware processor 14P. The computer memory 14M can also be referred to as a hardware memory 14M. The computer memory 14M can also be referred to as a computer-readable storage medium 14M.

The electronic controller 14C is programed to execute at least one control algorithm of the operating device 14. The computer memory 14M is configured to store at least one program including at least one program instructions. The at least one program is read into the computer processor 14P, and thereby the at least one control algorithm of the operating device 14 is executed based on the at least one program. The electronic controller 14C can also be referred to as an electronic control circuit or circuitry 14C. The electronic controller 14C can also be referred to as an operating hardware electronic controller 14C.

The structure of the electronic controller 14C is not limited to the above structure. The structure of the electronic controller 14C is not limited to the computer processor 14P, the computer memory 14M, the circuit board 14B, and the bus 14D. The electronic controller 14C can be realized by hardware alone or a combination of hardware and software. The computer processor 14P and the computer memory 14M can be integrated as one chip such as an ASIC or a FPGA.

The communicator 14W includes a signal generating circuit, a signal transmitting circuit, a signal receiving circuit, and an antenna. The signal generating circuit is configured to generate wireless signals (e.g., the control signals CS21 and CS22) based on each of the user inputs U21 and U22 received by the electric switches SW21 and SW22 of the operating device 14. The signal generating circuit is configured to superimpose digital signals on carrier wave using a predetermined wireless communication protocol to generate the wireless signals. The signal transmitting circuit is configured to transmit the wireless signal via the antenna in response to the electric signal which is input from each of the electric switches SW21 and SW22. In the present embodiment, the signal generating circuit is configured to encrypt control information to generate encrypted wireless signals. The signal generating circuit is configured to encrypt digital signals stored in the computer memory 14M using a cryptographic key. The signal transmitting circuit is configured to transmit the encrypted wireless signals. Thus, the operating device 14 is configured to wirelessly transmit the wireless signal to establish secured wireless communication.

Furthermore, the signal receiving circuit is configured to receive wireless signals from another wireless communicator via the antenna. In the present embodiment, the signal receiving circuit is configured to decode the wireless signal to recognize information wirelessly transmitted from another wireless communicator. The signal receiving circuit is configured to decrypt the encrypted wireless signal using the cryptographic key. Namely, the operating device 14 is configured to transmit a wireless signal to control an electric device and to receive a wireless signal to recognize information from the electric device. In other words, the operating device 14 is provided as a wireless transmitter and a wireless receiver. In the present embodiment, the operating device 14 is integrally provided as a single unit. However, the operating device 14 can be constituted of a wireless transmitter and a wireless receiver which are provided as separate units arranged at different positions from each other.

The operating device 14 includes an electric power source 14E. The electric power source 14E is electrically connected to the communicator 14W and the electronic controller 14C to supply electricity to the communicator 14W and the electronic controller 14C. The electric power source 14E includes a battery and a battery holder. The battery holder is configured to detachably and reattachably hold the battery. The battery holder is electrically mounted on the circuit board 14B. The battery holder is electrically connected to the communicator 14W and the electronic controller 14C. In a case where the operating device 14 is electrically connected to the electric power source PS via the wired communication structure WS, the electric power source 14E can be omitted from the operating device 14.

As seen in FIG. 2, the gear-changing device RD includes a base member RD9, a movable member RD1, an electric actuator RD2, a position sensor RD3, and an actuator driver RD4. The base member RD9 is secured to the vehicle body 2V. The movable member RD1 is movably coupled to the base member RD9. The movable member RD1 is configured to engage with the chain C. The electric actuator RD2 is coupled to the movable member RD1. The electric actuator RD2 is configured to move the movable member RD1 relative to the base member RD9 to shift the chain C relative to the sprocket assembly RS (FIG. 1). Examples of the electric actuator RD2 include an electric motor.

The position sensor RD3 is configured to sense a position of the electric actuator RD2 as a gear position of the gear-changing device RD. Examples of the position sensor RD3 include a potentiometer and a rotary encoder.

The actuator driver RD4 is electrically connected to the electric actuator RD2. The actuator driver RD4 is configured to control the electric actuator RD2 based on the gear position sensed by the position sensor RD3. The actuator driver RD4 is configured to control a movement direction and a movement speed of the movable member RD1 based on the gear position sensed by the position sensor RD3 and the control signals CS11 and CS12 transmitted from the operating device 12.

The gear-changing device RD includes a communicator RD5. The communicator RD5 is configured to communicate with another communicator of another device via wired or wireless communication. In the present embodiment, the communicator RD5 is configured to communicate with another communicator of another device via the wired communication structure WS using the PLC. However, the communicator RD5 can be configured to wirelessly communicate with another communicator of another device if needed and/or desired. The control device 10 can include the communicator RD5 if needed and/or desired.

The communicator RD5 is electrically connected to the actuator driver RD4 and the control device 10. The communicator RD5 is connected to the electric power source PS via the wired communication structure WS. The communicator RD5 is configured to separate input signals to a power source voltage and control signals. The communicator RD5 is configured to superimpose output signals on the power source voltage applied to the wired communication structure WS from the electric power source PS. The communicator RD5 is configured to control the power source voltage to a level at which the electric actuator RD2, the actuator driver RD4, and the control device 10 can properly operate.

As seen in FIG. 2, the assist driving unit DU includes a base member DU9, an electric actuator DU2, and an actuator driver DU4. The base member DU9 is secured to the vehicle body 2V. The electric actuator DU2 and the actuator driver DU4 are provided in the base member DU9. The electric actuator DU2 is configured to apply the assist force to the drive train 2E based on pedaling force applied to the crank CR (see e.g., FIG. 1). Examples of the electric actuator DU2 include an electric motor.

The actuator driver DU4 is electrically connected to the electric actuator DU2. The actuator driver DU4 is configured to control the electric actuator DU2 based on the applied assist ratio and the pedaling force.

The assist driving unit DU includes a communicator DU5. The communicator DU5 is configured to communicate with another communicator of another device via wired or wireless communication. In the present embodiment, the communicator DU5 is configured to communicate with another communicator of another device via the wired communication structure WS using the PLC. However, the communicator DU5 can be configured to wirelessly communicate with another communicator of another device if needed and/or desired.

The communicator DU5 is electrically connected to the actuator driver DU4. The communicator DU5 is connected to the electric power source PS via the wired communication structure WS. The communicator DU5 is configured to separate input signals to a power source voltage and control signals. The communicator DU5 is configured to superimpose output signals on the power source voltage applied to the wired communication structure WS from the electric power source PS. The communicator DU5 is configured to control the power source voltage to a level at which the electric actuator DU2 and the actuator driver DU4 can properly operate.

The assist driving unit DU includes a power meter PM. The power meter PM is coupled to the crank CR to measure the pedaling force applied to the crank CR during pedaling. For example, the power meter PM includes a strain gauge.

As seen in FIG. 2, the rider-posture changing device AS includes an electric actuator AS1, a first member AS3, a second member AS4, a positioning structure AS5, a position sensor AS6, and an actuator driver AS7. Examples of the electric actuator AS1 include an electric motor and a piezo-electric actuator.

The first member AS3 and the second member AS4 are movable relative to each other. The positioning structure AS5 is configured to adjustably position the first member AS3 and the second member AS4 relative to each other. The positioning structure AS5 is configured to position the first member AS3 and the second member AS4 relative to each other in a lock state. The positioning structure AS5 is configured to allow the first member AS3 and the second member AS4 to move relative to each other in an adjustable state. The electric actuator AS1 is configured to actuate the positioning structure AS5 to change a state of the positioning structure AS5 between the lock state and the adjustable state. The actuator driver AS7 is configured to control the electric actuator AS1 to actuate the positioning structure AS5.

The first member AS3 extends in a longitudinal direction D1. The second member AS4 extends in the longitudinal direction D1. The first member AS3 and the second member AS4 is configured to be movable relative to each other in the longitudinal direction D1. The positioning structure AS5 is configured to position the first member AS3 and the second member AS4 relative to each other in the longitudinal direction D1 in the lock state and configured to allow the first member AS3 and the second member AS4 to move relative to each other in the longitudinal direction D1 in the adjustable state.

In the present embodiment, the positioning structure AS5 includes a hydraulic valve configured to change the state of the positioning structure AS5 between the lock state and the adjustable state. The electric actuator AS1 is configured to move the hydraulic valve between a closed position and an open position. The positioning structure AS5 is in the lock state in a state where the hydraulic valve is in the closed position. The positioning structure AS5 is in the adjustable state in a state where the hydraulic valve is in the open position. However, the positioning structure AS5 can include other structures such as a ball screw.

As seen in FIG. 2, the electric actuator AS1 is electrically connected to the actuator driver AS7. The electric actuator AS1 includes a rotational shaft operatively coupled to the positioning structure AS5. The position sensor AS6 is configured to sense a current position of the hydraulic valve of the positioning structure AS5. Examples of the position sensor AS6 include a potentiometer and a rotary encoder. The position sensor AS6 is configured to sense an absolute rotational position of an output shaft of the electric actuator AS1 as the current position of the hydraulic valve of the positioning structure AS5.

The actuator driver AS7 is configured to control the electric actuator AS1 based on the current position sensed by the position sensor AS6 and the control signal CS21 transmitted from the operating device 14. For example, the actuator driver AS7 is configured to control the electric actuator AS1 to move the hydraulic valve from the closed position to the open position and to maintain the hydraulic valve in the open position during a predetermined time in response to the control signal CS21. The actuator driver AS7 can be configured to control the electric actuator AS1 to move the hydraulic valve from the closed position to the open position and to maintain the hydraulic valve in the open position during a time period for which the actuator driver AS7 receives the control signal CS21.

The rider-posture changing device AS includes a communicator AS8. The communicator AS8 is configured to communicate with another communicator of another device via wired or wireless communication. In the present embodiment, the communicator AS8 is configured to communicate with another communicator of another device via the wired communication structure WS using the PLC. However, the communicator AS8 can be configured to wirelessly communicate with another communicator of another device if needed and/or desired.

The communicator AS8 is electrically connected to the actuator driver AS7. The communicator AS8 is connected to the electric power source PS via the wired communication structure WS. The communicator AS8 is configured to separate input signals to a power source voltage and control signals. The communicator AS8 is configured to superimpose output signals on the power source voltage applied to the wired communication structure WS from the electric power source PS. The communicator AS8 is configured to control the power source voltage to a level at which the electric actuator AS1, the position sensor AS6, and the actuator driver AS7 can properly operate.

As seen in FIG. 2, the control device 10 for the human-powered vehicle 2 comprises an electronic controller 20C. The electronic controller 20C is electrically connected to the electric component EC to control the electric component EC. In the present embodiment, the electronic controller 20C is electrically connected to the informing unit IU, the assist driving unit DU, the gear-changing device RD, the braking device BD, the rider-posture changing device AS, and the light emitting device LE to control the informing unit IU, the assist driving unit DU, the gear-changing device RD, the braking device BD, the rider-posture changing device AS, and the light emitting device LE. However, the electronic controller 20C can be electrically connected to at least one of the informing unit IU, the assist driving unit DU, the gear-changing device RD, the braking device BD, the rider-posture changing device AS, and the light emitting device LE to control at least one of the informing unit IU, the assist driving unit DU, the gear-changing device RD, the braking device BD, the rider-posture changing device AS, and the light emitting device LE if needed and/or desired.

In the present embodiment, the control device 10 is provided in the gear-changing device RD. However, the control device 10 can be provided in another device such as the operating device 12, the informing unit IU, the assist driving unit DU, the braking device BD, the rider-posture changing device AS, and the light emitting device LE if needed and/or desired.

The electronic controller 20C includes a computer processor 20P, a computer memory 20M, a circuit board 20B, and a bus 20D. The computer processor 20P and the computer memory 20M are electrically mounted on the circuit board 20B. The computer processor 20P is electrically connected to the computer memory 20M via the circuit board 20B and the bus 20D. The circuit board 20B can include at least two separate circuit boards if needed and/or desired.

For example, the computer processor 20P includes at least one of a CPU, a MPU, and a memory controller. The computer memory 20M is electrically connected to the computer processor 20P. For example, the computer memory 20M includes at least one of a volatile memory and a non-volatile memory. Examples of the volatile memory include a RAM and a DRAM. Examples of the non-volatile memory include a ROM and an EEPROM. The computer memory 20M includes storage areas each having an address in the ROM and the RAM. The computer processor 20P is configured to control the computer memory 20M to store data in the storage areas of the computer memory 20M and reads data from the storage areas of the computer memory 20M. The computer processor 20P can also be referred to as a hardware processor 20P. The computer memory 20M can also be referred to as a hardware memory 20M. The computer memory 20M can also be referred to as a computer-readable storage medium 20M.

The electronic controller 20C is programed to execute at least one control algorithm of the control device 10 and the gear-changing device RD. The computer memory 20M is configured to store at least one program including at least one program instructions. The at least one program is read into the computer processor 20P, and thereby the at least one control algorithm of the control device 10 and the gear-changing device RD is executed based on the at least one program. The electronic controller 20C can also be referred to as an electronic control circuit or circuitry 20C. The electronic controller 20C can also be referred to as a hardware electronic controller 20C.

The structure of the electronic controller 20C is not limited to the above structure. The structure of the electronic controller 20C is not limited to the computer processor 20P, the computer memory 20M, the circuit board 20B, and the bus 20D. The electronic controller 20C can be realized by hardware alone or a combination of hardware and software. The computer processor 20P and the computer memory 20M can be integrated as one chip such as an ASIC or a FPGA.

The control device 10 includes a communicator 20W. The communicator 20W is configured to communicate with another wireless communicator of another device such as the operating devices 12 and 14 via wired or wireless communication. In the present embodiment, the communicator 20W is configured to wirelessly communicate with the operating devices 12 and 14. However, the communicator 20W can be configured to communicate with another wireless communicator of another device via wired communication if needed and/or desired.

The communicator 20W is configured to wirelessly communicate with each of the communicators 12W and 14W of the operating devices 12 and 14. The communicator 20W is configured to be paired with the communicators 12W and 14W of the operating devices 12 and 14 by pairing. The communicator 20W is configured to wirelessly receive the control signals CS11, CS12, CS13, CS21, and CS22 from the communicators 12W and 14W of the operating devices 12 and 14.

The communicator 20W includes a signal generating circuit, a signal transmitting circuit, a signal receiving circuit, and an antenna. The signal generating circuit is configured to generate wireless signals based on commands generated by the electronic controller 20C. The signal generating circuit is configured to superimpose digital signals on carrier wave using a predetermined wireless communication protocol to generate the wireless signals. The signal transmitting circuit is configured to transmit the wireless signal via the antenna in response to the commands generated by the electronic controller 20C. In the present embodiment, the signal generating circuit is configured to encrypt control information to generate encrypted wireless signals. The signal generating circuit is configured to encrypt digital signals stored in the computer memory 20M using a cryptographic key. The signal transmitting circuit is configured to transmit the encrypted wireless signals. Thus, the communicator 20W is configured to wirelessly transmit the wireless signal to establish secured wireless communication.

Furthermore, the signal receiving circuit is configured to receive wireless signals (e.g., the control signals CS11, CS12, CS13, CS21, and CS22) from each of the operating devices 12 and 14 via the antenna. In the present embodiment, the signal receiving circuit is configured to decode the wireless signal to recognize information wirelessly transmitted from each of the operating devices 12 and 14. The signal receiving circuit is configured to decrypt the encrypted wireless signal using the cryptographic key. Namely, the communicator 20W is configured to transmit a wireless signal to control an electric device and to receive a wireless signal to recognize information from the electric device. In other words, the communicator 20W is provided as a wireless transmitter and a wireless receiver. In the present embodiment, the communicator 20W is integrally provided as a single unit. However, the communicator 20W can be constituted of a wireless transmitter and a wireless receiver which are provided as separate units arranged at different positions from each other.

The electronic controller 20C is electrically connected to the assist driving unit DU via the wired communication structure WS to transmit the control signal CS13 to the assist driving unit DU if the electronic controller 20C receives the control signal CS13 from the operating device 14 via the communicator 20W. The electronic controller 20C is electrically connected to the actuator driver DU4 of the assist driving unit DU via the wired communication structure WS. The actuator driver DU4 of the assist driving unit DU is configured to receive the control signal CS13 from the operating device 12 via the control device 10 and the gear-changing device RD.

The electronic controller 20C is electrically connected to the rider-posture changing device AS via the wired communication structure WS to transmit the control signal CS21 to the rider-posture changing device AS if the electronic controller 20C receives the control signal CS21 from the operating device 14 via the communicator 20W. The electronic controller 20C is electrically connected to the actuator driver AS7 of the rider-posture changing device AS via the wired communication structure WS. The actuator driver AS7 of the rider-posture changing device AS is configured to receive the control signal CS21 from the operating device 14 via the control device 10 and the gear-changing device RD.

The communicator RD5 is electrically connected to the computer processor 20P and the computer memory 20M via the circuit board 20B and the bus 20D. The communicator RD5 is electrically connected to the electronic controller 20C and the gear-changing device RD. The communicator RD5 is configured to control the power source voltage to a level at which the electric actuator RD2, the position sensor RD3, the actuator driver RD4, and the electronic controller 20C can properly operate.

As seen in FIG. 2, the assist driving unit DU includes an electronic controller 22C. The electronic controller 22C is electrically connected to the actuator driver DU4 to control the actuator driver DU4. The electronic controller 22C is configured to receive the control signal CS13 from the operating device 12 via the gear-changing device RD and the wired communication structure WS.

The electronic controller 22C includes a computer processor 22P, a computer memory 22M, a circuit board 22B, and a bus 22D. The computer processor 22P and the computer memory 22M are electrically mounted on the circuit board 22B. The computer processor 22P is electrically connected to the computer memory 22M via the circuit board 22B and the bus 22D. The circuit board 22B can include at least two separate circuit boards if needed and/or desired.

For example, the computer processor 22P includes at least one of a CPU, a MPU, and a memory controller. The computer memory 22M is electrically connected to the computer processor 22P. For example, the computer memory 22M includes at least one of a volatile memory and a non-volatile memory. Examples of the volatile memory include a RAM and a DRAM. Examples of the non-volatile memory include a ROM and an EEPROM. The computer memory 22M includes storage areas each having an address in the ROM and the RAM. The computer processor 22P is configured to control the computer memory 22M to store data in the storage areas of the computer memory 22M and reads data from the storage areas of the computer memory 22M. The computer processor 22P can also be referred to as a hardware processor 22P. The computer memory 22M can also be referred to as a hardware memory 22M. The computer memory 22M can also be referred to as a computer-readable storage medium 22M.

The electronic controller 22C is programed to execute at least one control algorithm of the assist driving unit DU. The computer memory 22M is configured to store at least one program including at least one program instructions. The at least one program is read into the computer processor 22P, and thereby the at least one control algorithm of the assist driving unit DU is executed based on the at least one program. The electronic controller 22C can also be referred to as an electronic control circuit or circuitry 22C. The electronic controller 22C can also be referred to as a hardware electronic controller 22C.

The structure of the electronic controller 22C is not limited to the above structure. The structure of the electronic controller 22C is not limited to the computer processor 22P, the computer memory 22M, the circuit board 22B, and the bus 22D. The electronic controller 22C can be realized by hardware alone or a combination of hardware and software. The computer processor 22P and the computer memory 22M can be integrated as one chip such as an ASIC or a FPGA.

The electronic controller 22C is configured to control the applied assist ratio in accordance with the control signal CS13. The electronic controller 22C is configured to store at least two assist ratios in the computer memory 22M. The electronic controller 22C is configured to change the applied assist ratio among the at least two assist ratios based on the control signal CS13.

In a case where the at least two assist ratios includes a first assist ratio, a second assist ratio, and a third assist ratio, for example, the electronic controller 22C is configured to change the applied assist ratio among the first assist ratio, the second assist ratio, and the third assist ratio in this order in response to the control signal CS13. The first to third assist ratios are different from each other. The second assist ratio is higher than the first assist ratio. The third assist ratio is higher than the second assist ratio.

The electronic controller 22C is configured to calculate the assist force based on the selected assist ratio and the pedaling force measured by the power meter PM. The electronic controller 22C is electrically connected to the power meter PM to receive the pedaling force measured by the power meter PM. The electronic controller 22C is configured to control the actuator driver DU4 to control an output of the electric actuator DU2 based on the calculated assist force.

As seen in FIG. 2, the rider-posture changing device AS includes an electronic controller 24C. The electronic controller 24C is electrically connected to the actuator driver AS7 to control the actuator driver AS7. The electronic controller 24C is configured to receive the control signal CS21 from the operating device 14 via the gear-changing device RD and the wired communication structure WS.

The electronic controller 24C includes a computer processor 24P, a computer memory 24M, a circuit board 24B, and a bus 24D. The computer processor 24P and the computer memory 24M are electrically mounted on the circuit board 24B. The computer processor 24P is electrically connected to the computer memory 24M via the circuit board 24B and the bus 24D. The circuit board 24B can include at least two separate circuit boards if needed and/or desired.

For example, the computer processor 24P includes at least one of a CPU, a MPU, and a memory controller. The computer memory 24M is electrically connected to the computer processor 24P. For example, the computer memory 24M includes at least one of a volatile memory and a non-volatile memory. Examples of the volatile memory include a RAM and a DRAM. Examples of the non-volatile memory include a ROM and an EEPROM. The computer memory 24M includes storage areas each having an address in the ROM and the RAM. The computer processor 24P is configured to control the computer memory 24M to store data in the storage areas of the computer memory 24M and reads data from the storage areas of the computer memory 24M. The computer processor 24P can also be referred to as a hardware processor 24P. The computer memory 24M can also be referred to as a hardware memory 24M. The computer memory 24M can also be referred to as a computer-readable storage medium 24M.

The electronic controller 24C is programed to execute at least one control algorithm of the rider-posture changing device AS. The computer memory 24M is configured to store at least one program including at least one program instructions. The at least one program is read into the computer processor 24P, and thereby the at least one control algorithm of the rider-posture changing device AS is executed based on the at least one program. The electronic controller 24C can also be referred to as an electronic control circuit or circuitry 24C. The electronic controller 24C can also be referred to as a hardware electronic controller 24C.

The structure of the electronic controller 24C is not limited to the above structure. The structure of the electronic controller 24C is not limited to the computer processor 24P, the computer memory 24M, the circuit board 24B, and the bus 24D. The electronic controller 24C can be realized by hardware alone or a combination of hardware and software. The computer processor 24P and the computer memory 24M can be integrated as one chip such as an ASIC or a FPGA.

As seen in FIG. 2, the communicator 20W of the control device 10 is configured to communicate with the braking device BD. The braking device BD includes an automatic brake control unit BD3. The automatic brake control unit BD3 is configured to operate at least one of the brake calipers BD1 and BD2 in response to a brake operating signal transmitted from the electronic controller 20C of the control device 10. For example, the automatic brake control unit BD3 includes a motor pump and a valve structure. The automatic brake control unit BD3 is configured to supply a hydraulic pressure to at least one of the brake calipers BD1 and BD2 in response to the brake operating signal.

The braking device BD includes an electronic controller 25C, a communicator 25W, and an electric power source 25E. The electronic controller 25C is configured to control the motor pump and the valve structure of the automatic brake control unit BD3 to supply a hydraulic pressure to at least one of the brake calipers BD1 and BD2 in response to the brake operating signal.

The electronic controller 25C includes a computer processor 25P, a computer memory 25M, a circuit board 25B, and a bus 25D. The computer processor 25P and the computer memory 25M are electrically mounted on the circuit board 25B. The computer processor 25P is electrically connected to the computer memory 25M via the circuit board 25B and the bus 25D. The circuit board 25B can include at least two separate circuit boards if needed and/or desired.

For example, the computer processor 25P includes at least one of a CPU, a MPU, and a memory controller. The computer memory 25M is electrically connected to the computer processor 25P. For example, the computer memory 25M includes at least one of a volatile memory and a non-volatile memory. Examples of the volatile memory include a RAM and a DRAM. Examples of the non-volatile memory include a ROM and an EEPROM. The computer memory 25M includes storage areas each having an address in the ROM and the RAM. The computer processor 25P is configured to control the computer memory 25M to store data in the storage areas of the computer memory 25M and reads data from the storage areas of the computer memory 25M. The computer processor 25P can also be referred to as a hardware processor 25P. The computer memory 25M can also be referred to as a hardware memory 25M. The computer memory 25M can also be referred to as a computer-readable storage medium 25M.

The electronic controller 25C is programed to execute at least one control algorithm of the braking device BD. The computer memory 25M is configured to store at least one program including at least one program instructions. The at least one program is read into the computer processor 25P, and thereby the at least one control algorithm of the braking device BD is executed based on the at least one program. The electronic controller 25C can also be referred to as an electronic control circuit or circuitry 25C. The electronic controller 25C can also be referred to as a hardware electronic controller 25C.

The structure of the electronic controller 25C is not limited to the above structure. The structure of the electronic controller 25C is not limited to the computer processor 25P, the computer memory 25M, the circuit board 25B, and the bus 25D. The electronic controller 25C can be realized by hardware alone or a combination of hardware and software. The computer processor 25P and the computer memory 25M can be integrated as one chip such as an ASIC or a FPGA.

The communicator 25W is configured to communicate with another wireless communicator of another device via wired or wireless communication. In the present embodiment, the communicator 25W is configured to wirelessly communicate with the control device 10. However, the communicator 25W can be configured to communicate with another wireless communicator of another device via wired communication if needed and/or desired.

For example, the communicator 25W is configured to be paired with the communicator 20W of the control device 10 by pairing. The communicator 25W is configured to wirelessly receive information from the communicator 20W of the control device 10.

The communicator 25W includes a signal generating circuit, a signal transmitting circuit, a signal receiving circuit, and an antenna. The signal generating circuit is configured to generate wireless signals based on commands generated by the electronic controller 25C. The signal generating circuit is configured to superimpose digital signals on carrier wave using a predetermined wireless communication protocol to generate the wireless signals. The signal transmitting circuit is configured to transmit the wireless signal via the antenna in response to the commands generated by the electronic controller 25C. In the present embodiment, the signal generating circuit is configured to encrypt control information to generate encrypted wireless signals. The signal generating circuit is configured to encrypt digital signals stored in the computer memory 25M using a cryptographic key. The signal transmitting circuit is configured to transmit the encrypted wireless signals. Thus, the communicator 25W is configured to wirelessly transmit the wireless signal to establish secured wireless communication.

Furthermore, the signal receiving circuit is configured to receive wireless signals from the control device 10 via the antenna. In the present embodiment, the signal receiving circuit is configured to decode the wireless signal to recognize information wirelessly transmitted from the control device 10. The signal receiving circuit is configured to decrypt the encrypted wireless signal using the cryptographic key. Namely, the communicator 25W is configured to transmit a wireless signal to control an electric device and to receive a wireless signal to recognize information from the electric device. In other words, the communicator 25W is provided as a wireless transmitter and a wireless receiver. In the present embodiment, the communicator 25W is integrally provided as a single unit. However, the communicator 25W can be constituted of a wireless transmitter and a wireless receiver which are provided as separate units arranged at different positions from each other.

The electric power source 25E is electrically connected to the automatic brake control unit BD3, the electronic controller 25C, and the communicator 25W. For example, the electric power source 25E includes a battery.

Figure 3:
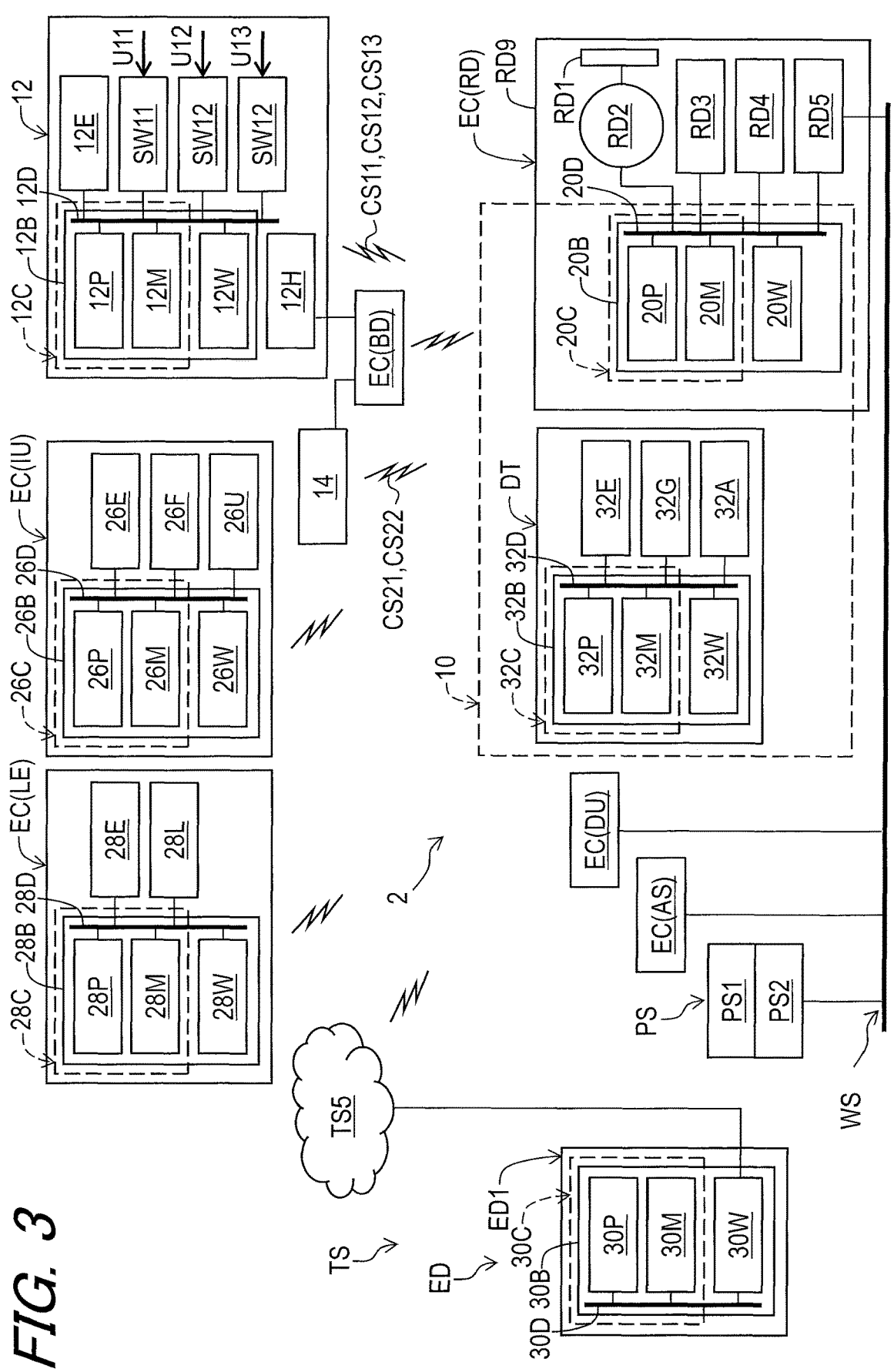

As seen in FIG. 3, the communicator 20W of the control device 10 is configured to wirelessly communicate with the informing unit IU. The informing unit IU includes an electronic controller 26C, a communicator 26W, a display 26F, a user interface 26U, and an electric power source 26E. The electronic controller 26C is electrically connected to the communicator 26W, the display 26F, the user interface 26U, and the electric power source 26E.

The electronic controller 26C includes a computer processor 26P, a computer memory 26M, a circuit board 26B, and a bus 26D. The computer processor 26P and the computer memory 26M are electrically mounted on the circuit board 26B. The computer processor 26P is electrically connected to the computer memory 26M via the circuit board 26B and the bus 26D. The circuit board 26B can include at least two separate circuit boards if needed and/or desired.

For example, the computer processor 26P includes at least one of a CPU, a MPU, and a memory controller. The computer memory 26M is electrically connected to the computer processor 26P. For example, the computer memory 26M includes at least one of a volatile memory and a non-volatile memory. Examples of the volatile memory include a RAM and a DRAM. Examples of the non-volatile memory include a ROM and an EEPROM. The computer memory 26M includes storage areas each having an address in the ROM and the RAM. The computer processor 26P is configured to control the computer memory 26M to store data in the storage areas of the computer memory 26M and reads data from the storage areas of the computer memory 26M. The computer processor 26P can also be referred to as a hardware processor 26P. The computer memory 26M can also be referred to as a hardware memory 26M. The computer memory 26M can also be referred to as a computer-readable storage medium 26M.

The electronic controller 26C is programed to execute at least one control algorithm of the informing unit IU. The computer memory 26M is configured to store at least one program including at least one program instructions. The at least one program is read into the computer processor 26P, and thereby the at least one control algorithm of the informing unit IU is executed based on the at least one program. The electronic controller 26C can also be referred to as an electronic control circuit or circuitry 26C. The electronic controller 26C can also be referred to as a hardware electronic controller 26C.

The structure of the electronic controller 26C is not limited to the above structure. The structure of the electronic controller 26C is not limited to the computer processor 26P, the computer memory 26M, the circuit board 26B, and the bus 26D. The electronic controller 26C can be realized by hardware alone or a combination of hardware and software. The computer processor 26P and the computer memory 26M can be integrated as one chip such as an ASIC or a FPGA.

The communicator 26W is configured to communicate with another wireless communicator of another device such as the operating devices 12 and 14 and the control device 10 via wired or wireless communication. In the present embodiment, the communicator 26W is configured to wirelessly communicate with the operating devices 12 and 14 and the control device 10. However, the communicator 26W can be configured to communicate with another wireless communicator of another device via wired communication if needed and/or desired.

For example, the communicator 26W is configured to be paired with the communicator 20W of the control device 10 by pairing. The communicator 26W is configured to wirelessly receive information from the communicator 20W of the control device 10.

The communicator 26W includes a signal generating circuit, a signal transmitting circuit, a signal receiving circuit, and an antenna. The signal generating circuit is configured to generate wireless signals based on commands generated by the electronic controller 26C. The signal generating circuit is configured to superimpose digital signals on carrier wave using a predetermined wireless communication protocol to generate the wireless signals. The signal transmitting circuit is configured to transmit the wireless signal via the antenna in response to the commands generated by the electronic controller 26C. In the present embodiment, the signal generating circuit is configured to encrypt control information to generate encrypted wireless signals. The signal generating circuit is configured to encrypt digital signals stored in the computer memory 26M using a cryptographic key. The signal transmitting circuit is configured to transmit the encrypted wireless signals. Thus, the communicator 26W is configured to wirelessly transmit the wireless signal to establish secured wireless communication.

Furthermore, the signal receiving circuit is configured to receive wireless signals from the control device 10 via the antenna. In the present embodiment, the signal receiving circuit is configured to decode the wireless signal to recognize information wirelessly transmitted from the control device 10. The signal receiving circuit is configured to decrypt the encrypted wireless signal using the cryptographic key. Namely, the communicator 26W is configured to transmit a wireless signal to control an electric device and to receive a wireless signal to recognize information from the electric device. In other words, the communicator 26W is provided as a wireless transmitter and a wireless receiver. In the present embodiment, the communicator 26W is integrally provided as a single unit. However, the communicator 26W can be constituted of a wireless transmitter and a wireless receiver which are provided as separate units arranged at different positions from each other.

The display 26F is configured to display information relating to the informing unit IU, the human-powered vehicle 2, environmental data, and other devices. The electronic controller 26C is electrically connected to the display 26F to control the display 26F.

The user interface 26U is configured to receive a user input from the user. Examples of the user interface 26U include a touchscreen and a keyboard. In the present embodiment, the user interface 26U includes a touchscreen. The display 26F and the user interface 26U constitute the touchscreen. The electronic controller 26C is electrically connected to the user interface 26U to receive the user input via the user interface 26U.

The electric power source 26E is electrically connected to the electronic controller 26C, the communicator 26W, the display 26F, and the user interface 26U to supply electricity to the electronic controller 26C, the communicator 26W, the display 26F, and the user interface 26U. For example, the electric power source 26E includes a battery.

As seen in FIG. 3, the communicator 20W of the control device 10 is configured to wirelessly communicate with the light emitting device LE. The light emitting device LE includes a light emitter 28L, an electronic controller 28C, a communicator 28W, and an electric power source 28E. The electronic controller 28C is electrically connected to the light emitter 28L, the communicator 28W, and the electric power source 28E. The light emitter 28L is configured to emit light. The light emitter 28L includes a light emitting diode (LED) and a light control circuit. The electronic controller 28C is configured to control the light emitter 28L to emit light.

The electronic controller 28C includes a computer processor 28P, a computer memory 28M, a circuit board 28B, and a bus 28D. The computer processor 28P and the computer memory 28M are electrically mounted on the circuit board 28B. The computer processor 28P is electrically connected to the computer memory 28M via the circuit board 28B and the bus 28D. The circuit board 28B can include at least two separate circuit boards if needed and/or desired.

For example, the computer processor 28P includes at least one of a CPU, a MPU, and a memory controller. The computer memory 28M is electrically connected to the computer processor 28P. For example, the computer memory 28M includes at least one of a volatile memory and a non-volatile memory. Examples of the volatile memory include a RAM and a DRAM. Examples of the non-volatile memory include a ROM and an EEPROM. The computer memory 28M includes storage areas each having an address in the ROM and the RAM. The computer processor 28P is configured to control the computer memory 28M to store data in the storage areas of the computer memory 28M and reads data from the storage areas of the computer memory 28M. The computer processor 28P can also be referred to as a hardware processor 28P. The computer memory 28M can also be referred to as a hardware memory 28M. The computer memory 28M can also be referred to as a computer-readable storage medium 28M.

The electronic controller 28C is programed to execute at least one control algorithm of the light emitting device LE. The computer memory 28M is configured to store at least one program including at least one program instructions. The at least one program is read into the computer processor 28P, and thereby the at least one control algorithm of the light emitting device LE is executed based on the at least one program. The electronic controller 28C can also be referred to as an electronic control circuit or circuitry 28C. The electronic controller 28C can also be referred to as a hardware electronic controller 28C.

The structure of the electronic controller 28C is not limited to the above structure. The structure of the electronic controller 28C is not limited to the computer processor 28P, the computer memory 28M, the circuit board 28B, and the bus 28D. The electronic controller 28C can be realized by hardware alone or a combination of hardware and software. The computer processor 28P and the computer memory 28M can be integrated as one chip such as an ASIC or a FPGA.

The communicator 28W is configured to communicate with another wireless communicator of another device such as the operating devices 12 and 14 and the control device 10 via wired or wireless communication. In the present embodiment, the communicator 28W is configured to wirelessly communicate with the operating devices 12 and 14 and the control device 10. However, the communicator 28W can be configured to communicate with another wireless communicator of another device via wired communication if needed and/or desired.

For example, the communicator 28W is configured to be paired with the communicator 20W of the control device 10 by pairing. The communicator 28W is configured to wirelessly receive information from the communicator 20W of the control device 10.

The communicator 28W includes a signal generating circuit, a signal transmitting circuit, a signal receiving circuit, and an antenna. The signal generating circuit is configured to generate wireless signals based on commands generated by the electronic controller 28C. The signal generating circuit is configured to superimpose digital signals on carrier wave using a predetermined wireless communication protocol to generate the wireless signals. The signal transmitting circuit is configured to transmit the wireless signal via the antenna in response to the commands generated by the electronic controller 28C. In the present embodiment, the signal generating circuit is configured to encrypt control information to generate encrypted wireless signals. The signal generating circuit is configured to encrypt digital signals stored in the computer memory 28M using a cryptographic key. The signal transmitting circuit is configured to transmit the encrypted wireless signals. Thus, the communicator 28W is configured to wirelessly transmit the wireless signal to establish secured wireless communication.

Furthermore, the signal receiving circuit is configured to receive wireless signals from the control device 10 via the antenna. In the present embodiment, the signal receiving circuit is configured to decode the wireless signal to recognize information wirelessly transmitted from the control device 10. The signal receiving circuit is configured to decrypt the encrypted wireless signal using the cryptographic key. Namely, the communicator 28W is configured to transmit a wireless signal to control an electric device and to receive a wireless signal to recognize information from the electric device. In other words, the communicator 28W is provided as a wireless transmitter and a wireless receiver. In the present embodiment, the communicator 28W is integrally provided as a single unit. However, the communicator 28W can be constituted of a wireless transmitter and a wireless receiver which are provided as separate units arranged at different positions from each other.

The electric power source 28E is electrically connected to the light emitter 28L, the electronic controller 28C, and the communicator 28W. For example, the electric power source 28E includes a battery.

As seen in FIG. 3, the control device 10 is configured to communicate with an external device ED. The external device ED is remotely located outside the human-powered vehicle 2. The external device ED is not included in the human-powered vehicle 2. The electronic controller of the control device 10 is configured to communicate with the external device ED via network such as internet. In the present embodiment, a traffic infrastructure system TS includes the external device ED. However, the external device ED can be provided outside the traffic infrastructure system TS if needed and/or desired.

For example, the external device ED includes at least one computer server. In the present embodiment, the external device ED includes a computer server ED1. The computer server ED1 includes a server electronic controller 30C and a server communicator 30W. The server electronic controller 30C is electrically connected to the server communicator 30W to control the server communicator 30W. The server communicator 30W is configured to communicate with other servers, vehicles VH, motorcycles MC, human-powered vehicles HP, electric devices (e.g., a cyclocomputer, a smartphone, a smartwatch, a tablet computer), infrastructures, and other devices or systems via network such as internet.

The server electronic controller 30C includes a computer processor 30P, a computer memory 30M, a circuit board 30B, and a bus 30D. The computer processor 30P and the computer memory 30M are electrically mounted on the circuit board 30B. The computer processor 30P is electrically connected to the computer memory 30M via the circuit board 30B and the bus 30D. The circuit board 30B can include at least two separate circuit boards if needed and/or desired.

For example, the computer processor 30P includes at least one of a CPU, a MPU, and a memory controller. The computer memory 30M is electrically connected to the computer processor 30P. For example, the computer memory 30M includes at least one of a volatile memory and a non-volatile memory. Examples of the volatile memory include a RAM and a DRAM. Examples of the non-volatile memory include a ROM and an EEPROM. The computer memory 30M includes storage areas each having an address in the ROM and the RAM. The computer processor 30P is configured to control the computer memory 30M to store data in the storage areas of the computer memory 30M and reads data from the storage areas of the computer memory 30M. The computer processor 30P can also be referred to as a hardware processor 30P. The computer memory 30M can also be referred to as a hardware memory 30M. The computer memory 30M can also be referred to as a computer-readable storage medium 30M.

The server electronic controller 30C is programed to execute at least one control algorithm of the computer server ED1. The computer memory 30M is configured to store at least one program including at least one program instructions. The at least one program is read into the computer processor 30P, and thereby the at least one control algorithm of the computer server ED1 is executed based on the at least one program. The server electronic controller 30C can also be referred to as an electronic control circuit or circuitry 30C. The server electronic controller 30C can also be referred to as an operating hardware server electronic controller 30C.

The structure of the server electronic controller 30C is not limited to the above structure. The structure of the server electronic controller 30C is not limited to the computer processor 30P, the computer memory 30M, the circuit board 30B, and the bus 30D. The server electronic controller 30C can be realized by hardware alone or a combination of hardware and software. The computer processor 30P and the computer memory 30M can be integrated as one chip such as an ASIC or a FPGA.

The server electronic controller 30C is configured to store data received from other devices in the computer memory 30M. The server electronic controller 30C is configured to control the server communicator 30W to transmit to information stored in the computer memory 30M and/or obtained by the computer server ED1.

As seen in FIG. 3, the control device 10 further comprises a detector DT. The detector DT is configured to detect at least one of geographical positions of the control device 10 and obstacles around the human-powered vehicle 2. In the present embodiment, the detector DT is configured to detect the geographical positions of the control device 10 and the obstacles around the human-powered vehicle 2. The road object information relates to the obstacles around the human-powered vehicle 2. Thus, the detector DT is configured to detect the road object information. However, the detector DT can be configured to detect only one of the geographical positions of the control device 10 and the obstacles around the human-powered vehicle 2 if needed and/or desired. The detector DT can be omitted from the control device 10 if needed and/or desired.

The detector DT includes an electronic controller 32C, a communicator 32W, a global positioning receiver 32G, a camera 32A, and an electric power source 32E. The electronic controller 32C is electrically connected to the communicator 32W, the global positioning receiver 32G, the camera 32A, and the electric power source 32E. The detector DT can include devices (e.g., a gyro sensor) other than the global positioning receiver 32G and the camera 32A if needed and/or desired.

The electronic controller 32C includes a computer processor 32P, a computer memory 32M, a circuit board 32B, and a bus 32D. The computer processor 32P and the computer memory 32M are electrically mounted on the circuit board 32B. The computer processor 32P is electrically connected to the computer memory 32M via the circuit board 32B and the bus 32D. The circuit board 32B can include at least two separate circuit boards if needed and/or desired.

For example, the computer processor 32P includes at least one of a CPU, a MPU, and a memory controller. The computer memory 32M is electrically connected to the computer processor 32P. For example, the computer memory 32M includes at least one of a volatile memory and a non-volatile memory. Examples of the volatile memory include a RAM and a DRAM. Examples of the non-volatile memory include a ROM and an EEPROM. The computer memory 32M includes storage areas each having an address in the ROM and the RAM. The computer processor 32P is configured to control the computer memory 32M to store data in the storage areas of the computer memory 32M and reads data from the storage areas of the computer memory 32M. The computer processor 32P can also be referred to as a hardware processor 32P. The computer memory 32M can also be referred to as a hardware memory 32M. The computer memory 32M can also be referred to as a computer-readable storage medium 32M.

The electronic controller 32C is programed to execute at least one control algorithm of the detector DT. The computer memory 32M is configured to store at least one program including at least one program instructions. The at least one program is read into the computer processor 32P, and thereby the at least one control algorithm of the detector DT is executed based on the at least one program. The electronic controller 32C can also be referred to as an electronic control circuit or circuitry 32C. The electronic controller 32C can also be referred to as a hardware electronic controller 32C.

The structure of the electronic controller 32C is not limited to the above structure. The structure of the electronic controller 32C is not limited to the computer processor 32P, the computer memory 32M, the circuit board 32B, and the bus 32D. The electronic controller 32C can be realized by hardware alone or a combination of hardware and software. The computer processor 32P and the computer memory 32M can be integrated as one chip such as an ASIC or a FPGA.

The communicator 32W is configured to communicate with another communicator of another device such as the operating devices 12 and 14, the control device 10, the gear-changing device RD, the assist driving unit DU, the rider-posture changing device AS via wired or wireless communication. In the present embodiment, the communicator 32W is configured to wirelessly communicate with the communicator 20W of the control device 10. However, the communicator 32W can be configured to communicate with another communicator of another device via wired wireless communication if needed and/or desired.

For example, the communicator 32W is configured to be paired with the communicator 20W of the control device 10 by pairing. The communicator 32W is configured to wirelessly receive information from the communicator 20W of the control device 10.

The communicator 32W includes a signal generating circuit, a signal transmitting circuit, a signal receiving circuit, and an antenna. The signal generating circuit is configured to generate wireless signals based on commands generated by the electronic controller 32C. The signal generating circuit is configured to superimpose digital signals on carrier wave using a predetermined wireless communication protocol to generate the wireless signals. The signal transmitting circuit is configured to transmit the wireless signal via the antenna in response to the commands generated by the electronic controller 32C. In the present embodiment, the signal generating circuit is configured to encrypt control information to generate encrypted wireless signals. The signal generating circuit is configured to encrypt digital signals stored in the computer memory 32M using a cryptographic key. The signal transmitting circuit is configured to transmit the encrypted wireless signals. Thus, the communicator 32W is configured to wirelessly transmit the wireless signal to establish secured wireless communication.

Furthermore, the signal receiving circuit is configured to receive wireless signals from the communicator 20W via the antenna. In the present embodiment, the signal receiving circuit is configured to decode the wireless signal to recognize information wirelessly transmitted from the communicator 20W. The signal receiving circuit is configured to decrypt the encrypted wireless signal using the cryptographic key. Namely, the communicator 32W is configured to transmit a wireless signal to control an electric device and to receive a wireless signal to recognize information from the electric device. In other words, the communicator 32W is provided as a wireless transmitter and a wireless receiver. In the present embodiment, the communicator 32W is integrally provided as a single unit. However, the communicator 32W can be constituted of a wireless transmitter and a wireless receiver which are provided as separate units arranged at different positions from each other.

The electric power source 32E is electrically connected to the electronic controller 32C, the communicator 32W, the global positioning receiver 32G, and the camera 32A. For example, the electric power source 32E includes a battery.

The global positioning receiver 32G is configured to detect a current geographical position of the global positioning receiver 32G. For example, the global positioning receiver 32G is configured to receive the current geographical position of the global positioning receiver 32G from GNSS. The detector DT is configured to be mounted to any part of the human-powered vehicle 2. For example, the detector DT is mounted to the vehicle body 2V. Namely, the current geographical position of the detector DT is substantially the same as the current geographical position of the control device 10 and/or the human-powered vehicle 2. Thus, the global positioning receiver 32G is configured to detect the current geographical position of the control device 10 and/or the human-powered vehicle 2 in GNSS.

The electrical controller 32C is configured to receive the current geographical position received by the global positioning receiver 32G. The global positioning receiver 32G can be configured to periodically transmit the current geographical position of the control device 10 and/or the human-powered vehicle 2 to the external device ED via network such as internet. The electronic controller 32C can be configured to control the communicator 32W to transmit the current geographical position detected by the global positioning receiver 32G. In the present embodiment, the global positioning receiver 32G is electrically mounted on the circuit board 32B. However, the global positioning receiver 32G can be electrically mounted on the circuit board 20B if needed and/or desired.

The camera 32A is configured to capture a real-time image of at least one of a forward view, a rearward view, a right view, and a left view of the human-powered vehicle 2. Thus, the camera 32A is configured to capture a real-time image of obstacles around the human-powered vehicle 2 if the obstacles are around the human-powered vehicle 2. The camera 32A is electrically connected to the electronic controller 32C. The electronic controller 32C is configured to receive the real-time image from the camera 32A. The electronic controller 32C can be configured to analyze the real-time image to obtain the road object information relating to the obstacles around the human-powered vehicle 2. The electronic controller 32C can be configured to control the communicator 32W to transmit the real-time image captured by the camera 32A to the electronic controller 20C via the communicator 20W. The electronic controller 20C can be configured to analyze the real-time image to obtain the road object information relating to the obstacles around the human-powered vehicle 2.

Figure 4:
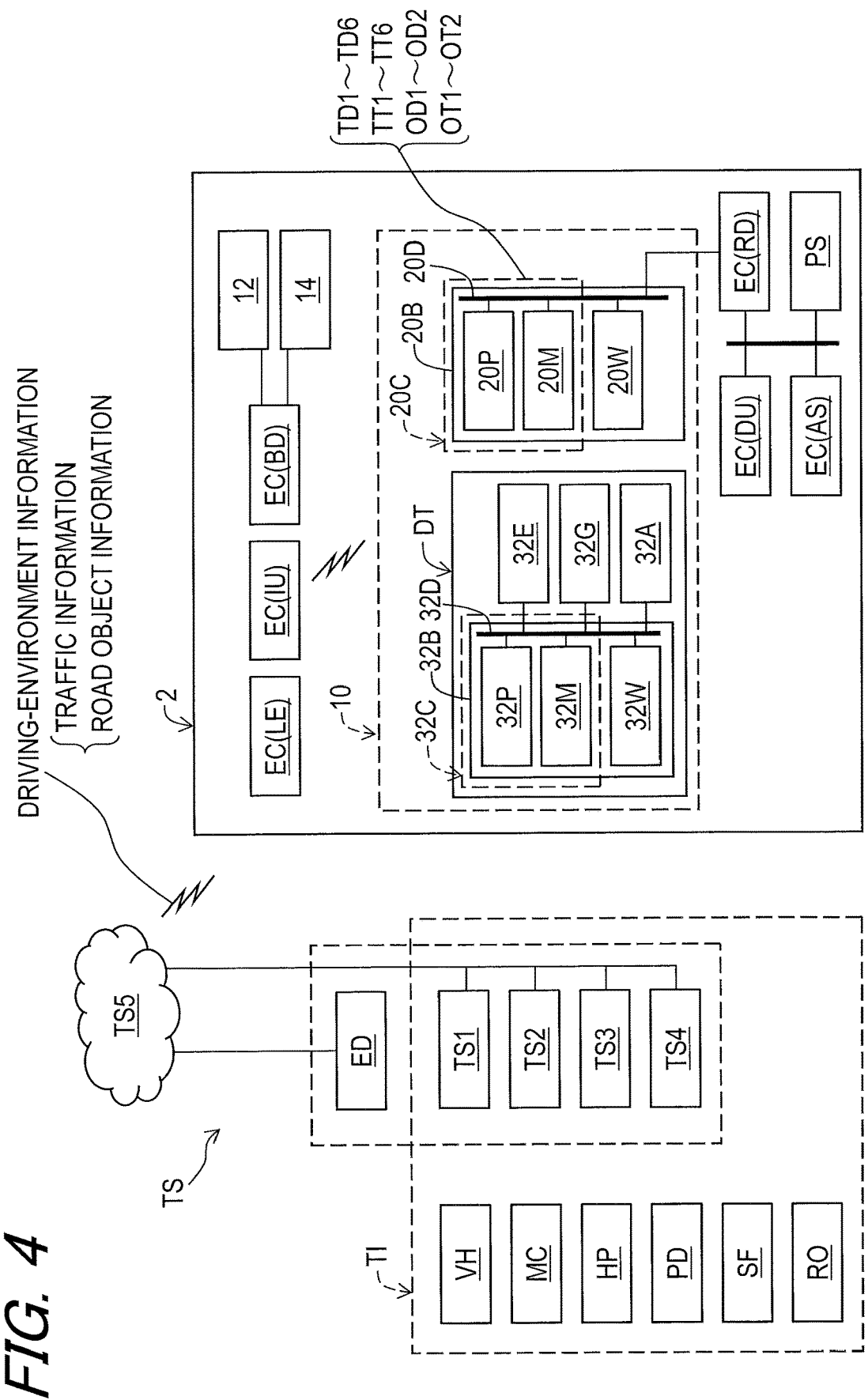

As seen in FIG. 4, the electronic controller 20C is configured to obtain driving-environment information relating to driving environment of the human-powered vehicle 2. The driving-environment information includes at least one of traffic information and road object information. The traffic information relates to traffic. The road object information relates to road objects RO.

The traffic infrastructure system TS is configured to obtain the driving-environment information from traffic infrastructure TI. The traffic infrastructure system TS is configured to obtain the traffic information and the road object information.

For example, the traffic infrastructure system TS includes the external device ED, traffic lights TS1, traffic sensors TS2, speed traps TS3, and cameras TS4. The traffic lights TS1, the traffic sensors TS2, the speed traps TS3, and the cameras TS4 are installed in the traffic infrastructure TI. The traffic infrastructure system TS can include other devices if needed and/or desired.

The external device ED is configured to obtain data from the traffic lights TS1, the traffic sensors TS2, the speed traps TS3, and the cameras TS4 via a network TS5. The external device ED is configured to obtain data from the traffic lights TS1, the traffic sensors TS2, the speed traps TS3, and the cameras TS4 via the network TS5.

The traffic lights TS1 are electrically connected to the external device ED of the traffic infrastructure system TS via the network TS5. The traffic lights TS1 are configured to be connected to the network TS5 via wired or wireless communication. The external device ED is configured to obtain current states of the traffic lights TS1 from the traffic lights TS1 via the network TS5.

The traffic sensors TS2 are electrically connected to the external device ED of the traffic infrastructure system TS via the network TS5. The traffic sensors TS2 are configured to be connected to the network TS5 via wired or wireless communication. The traffic sensor TS2 is configured to detect vehicles VH, motorcycles MC, and human-powered vehicles HP which run and/or stop on roadways. The external device ED is configured to obtain detection results from the traffic sensors TS2 via the network TS5. The external device ED is configured to obtain a total number of vehicles VH, motorcycles MC, and human-powered vehicles HP which run and/or stop on roadways based on the detection results of the traffic sensors TS2. The external device ED is configured to obtain traffic jam data based on the detection results of the traffic sensors TS2.

The speed traps TS3 are electrically connected to the external device ED of the traffic infrastructure system TS via the network TS5. The speed traps TS3 are configured to be connected to the network TS5 via wired or wireless communication. The speed trap TS3 is configured to detect speeding vehicles VH and/or speeding motorcycles MC. The external device ED is configured to obtain detection results from the speed traps TS3 via the network TS5. The external device ED is configured to obtain geographical positions of speeding vehicles VH and/or speeding motorcycles MC based on the detection results of the speed traps TS3.

The cameras TS4 are electrically connected to the external device ED of the traffic infrastructure system TS via the network TS5. The cameras TS4 are configured to be connected to the network TS5 via wired or wireless communication. The camera TS4 is configured to obtain real-time images of roadways. The external device ED is configured to obtain real-time images of roadways from the cameras TS4 via the network TS5. The external device ED is configured to obtain traffic jams, physical contacts, road surface conditions, or other information from the real-time images captured by the cameras TS4.

The external device ED is configured to analyze the obtained data and configured to create the driving-environment information. The external device ED is configured to create the traffic information and the road object information.

The traffic information includes at least one of vehicular traffic data, motorcycle traffic data, human-powered vehicle traffic data, pedestrian traffic data, road surface condition data, and occurrence data. In the present embodiment, the traffic information includes vehicular traffic data, motorcycle traffic data, human-powered vehicle traffic data, pedestrian traffic data, road surface condition data, and occurrence data. However, at least one of the vehicular traffic data, the motorcycle traffic data, the human-powered vehicle traffic data, the pedestrian traffic data, the road surface condition data, and the occurrence data can be omitted from the traffic information if needed and/or desired. For example, the traffic information can include only the vehicle traffic data without the motorcycle traffic data, the human-powered vehicle traffic data, the pedestrian traffic data, the road surface condition data, and the occurrence data if needed and/or desired. The traffic information can include data other than the vehicular traffic data, the motorcycle traffic data, the human-powered vehicle traffic data, the pedestrian traffic data, the road surface condition data, and the occurrence data if needed and/or desired.

For example, the vehicular traffic data include geographical positions of vehicles VH. A vehicle can include a global positioning receiver. The global positioning receiver is configured to receive a current geographical position of the vehicle from Global Navigational Satellite System (GNSS). Examples of GNSS includes Global Positioning System or Satellite (GPS), a GLONASS (Russian), and Galileo (European). For example, the vehicle includes a car navigation system including the global positioning receiver. A portable electric device (e.g., a smartphone, a smartwatch, a tablet computer) of a user of the vehicle can include the global positioning receiver. The vehicle or the portable electric device is configured to periodically transmit the current geographical position of the vehicle to the external device ED via network such as internet. The vehicular traffic data include geographical areas where traffic jams occur. The geographical areas of the traffic jams can be obtained based on the geographical positions of the vehicles VH.

The motorcycle traffic data include geographical positions of motorcycles MC. A motorcycle can include a global positioning receiver. The global positioning receiver is configured to receive a current geographical position of the motorcycle from GNSS. For example, the motorcycle includes a car navigation system including the global positioning receiver. A portable electric device (e.g., a smartphone, a smartwatch, a tablet computer) of a user of the motorcycle can include the global positioning receiver. The motorcycle or the portable electric device is configured to periodically transmit the current geographical position of the motorcycle to the external device ED via network such as internet.

The human-powered vehicle traffic data include geographical positions of human-powered vehicles HP. A human-powered vehicle can include a global positioning receiver. The global positioning receiver is configured to receive a current geographical position of the human-powered vehicle from GNSS. For example, the human-powered vehicle includes a car navigation system including the global positioning receiver. A portable electric device (e.g., a smartphone, a smartwatch, a tablet computer) of a user of the human-powered vehicle can include the global positioning receiver. The human-powered vehicle or the portable electric device is configured to periodically transmit the current geographical position of the human-powered vehicle to the external device ED via network such as internet.

The pedestrian traffic data include geographical positions of pedestrians PD. A portable electric device (e.g., a smartphone, a smartwatch, a tablet computer) of a pedestrian can include a global positioning receiver. The portable electric device of the pedestrian is configured to periodically transmit the current geographical position of the pedestrian to the external device ED via network such as internet.

The road surface condition data include conditions of road surfaces SF. The external device ED is configured to obtain the road surface condition data based on the real-time images of roadways captured by the cameras TS4.

The occurrence data include occurrences in the traffic infrastructure TI. The occurrence data includes physical contact data. The physical contact data relate to physical contacts between entities selected from among at least two of vehicles VH, motorcycles MC, human-powered vehicles HP, pedestrians PD, and road objects RO. For example, the external device ED is configured to obtain the occurrence data based on the images captured by the cameras TS4 of the traffic infrastructure system TS.

The traffic information includes past and present traffic data obtained from the traffic infrastructure system TS. The vehicular traffic data include past and present vehicular traffic data obtained from the traffic infrastructure system TS. The motorcycle traffic data include past and present motorcycle traffic data obtained from the traffic infrastructure system TS. The human-powered vehicle traffic data include past and present human-powered vehicle traffic data obtained from the traffic infrastructure system TS. The pedestrian traffic data include past and present pedestrian traffic data obtained from the traffic infrastructure system TS. The road surface condition data include past and present road surface condition data obtained from the traffic infrastructure system TS. The occurrence data include past and present occurrence data obtained from the traffic infrastructure system TS.

The road object information relates to at least one of non-living objects which are on roadways and living objects which are on roadways. In the present embodiment, the road object information relates to the non-living objects and the living object. However, at least one of the non-living objects and the living objects can be omitted from the road object information if needed and/or desired. For example, the road object information can include the non-living objects without the living objects if needed and/or desired. The road object information can include data other than the non-living objects and the living objects if needed and/or desired.

The non-living objects include vehicles VH parked on roadways, motorcycles MC parked on roadways, human-powered vehicles HP parked on roadways, and fallen objects on roadways. The living objects include animals other than pedestrians PD on roadways. For example, the external device ED is configured to obtain the road object information based on the images captured by the cameras TS4. The external device ED is configured to obtain the road object information from informants via telephones or internet.

As seen in FIG. 4, the electronic controller 20C is configured to obtain the driving-environment information from the external device ED. The electronic controller 20C is configured to obtain at least one of the traffic information and the road object information from the external device ED. In the present embodiment, the electronic controller 20C is configured to obtain the traffic information and the road object information from the external device ED via the communicator 20W and the network TS5. However, the electronic controller 20C can be configured to obtain only one of the traffic information and the road object information from the external device ED if needed and/or desired.

The electronic controller 20C is configured to obtain the driving-environment information based on a detection result of the detector DT. The driving-environment information includes the geographical position of the control device 10 and/or the human-powered vehicle 2. The electronic controller 20C is configured to obtain the current geographical position of the control device 10 and/or the human-powered vehicle 2 based on the detection result of the global positioning receiver 32G. The electronic controller 20C is configured to obtain the road object information based on the detection result of the camera 32A. The electronic controller 20C can be configured to obtain the obstacles approaching the control device 10 by analyzing the real-time image captured by the camera 32A.

The electronic controller 20C is configured to control the electric component EC based on the driving-environment information. The electronic controller 20C is configured to control the electric component EC based on at least one of the traffic information and the road object information. In the present embodiment, the electronic controller 20C is configured to control the electric component EC based on the traffic information and the road object information. However, the electronic controller 20C can be configured to control the electric component EC based on only one of the traffic information and the road object information if needed and/or desired.

The electronic controller 20C is configured to control the at least one of the informing unit IU, the assist driving unit DU, the gear-changing device RD, the braking device BD, the rider-posture changing device AS, and the light emitting device LE based on the driving-environment information. The electronic controller 20C is configured to control the at least one of the informing unit IU, the assist driving unit DU, the gear-changing device RD, the braking device BD, the rider-posture changing device AS, and the light emitting device LE based on at least one of the traffic information and the road object information.

In the present embodiment, the electronic controller 20C of the control device 10 is configured to control the informing unit IU, the assist driving unit DU, the gear-changing device RD, the braking device BD, the rider-posture changing device AS, and the light emitting device LE based on the traffic information and the road object information. However, the electronic controller 20C can be configured to control at least one of the informing unit IU, the assist driving unit DU, the gear-changing device RD, the braking device BD, the rider-posture changing device AS, and the light emitting device LE based on only one of the traffic information and the road object information if needed and/or desired.

The informing unit IU is configured to inform the user that the driving-environment information meets a condition. The electronic controller 20C is configured to control the informing unit IU to inform the user that the driving-environment information meets the condition if the driving-environment information meets the condition.

For example, the electronic controller 20C of the control device 10 is configured to determine whether the driving-environment information meets the condition. The electronic controller 20C is configured to determine whether the traffic information meets a traffic-state condition. The electronic controller 20C is configured to determine whether the road object information meets a road object condition. The electronic controller 20C is configured to conclude that the driving-environment information meets the condition if the traffic information is equal to or below a traffic-state threshold. The electronic controller 20C is configured to conclude that the driving-environment information meets the condition if the road object information is equal to or below a road object threshold.

As seen in FIG. 4, the electronic controller 20C is configured to store the traffic-state threshold in the computer memory 20M. The traffic-state threshold includes a first traffic-state threshold TT1, a second traffic-state threshold TT2, a third traffic-state threshold TT3, a fourth traffic-state threshold TT4, a fifth traffic-state threshold TT5, and a sixth traffic-state threshold TT6. The electronic controller 20C is configured to store the first to sixth traffic-state thresholds TT1 to TT6 in the computer memory 20M. At least one of the first to sixth traffic-state thresholds TT1 to TT6 can be changed via a user interface device such as a cyclocomputer, a smartphone, a smartwatch, a tablet computer, and a personal computer. The traffic-state threshold can be equal to or greater than zero. At least one of the first to sixth traffic-state thresholds TT1 to TT6 can be equal to or greater than zero. At least one of the first to sixth traffic-state thresholds TT1 to TT6 can be equal to or different from another of the first to sixth traffic-state thresholds TT1 to TT6.

For example, the condition includes a first traffic-state condition that a first distance TD1 defined from the control device 10 to an area which is within a predetermined distance from the control device 10 among first areas where red lights of the traffic lights TS1 are turned on is equal to or shorter than the first traffic-state threshold TT1. The external device ED of the traffic infrastructure system TS is configured to obtain the first areas where the traffic lights TS1 are located based on geographical positions of traffic lights TS1 included in the traffic information.

The condition includes a second traffic-state condition that a second distance TD2 defined from the control device 10 to an area which is within a predetermined distance from the control device 10 among second areas where traffic jams are occurring is equal to or shorter than the second traffic-state threshold TT2. The external device ED of the traffic infrastructure system TS is configured to obtain the second areas where traffic jams are occurring based on the vehicular traffic data and the motorcycle traffic data of the traffic information.

The condition includes a third traffic-state condition that a third distance TD3 defined from the control device 10 to an area which is within a predetermined distance from the control device 10 among third areas where human-powered vehicles HP are moving and/or stopping is equal to or shorter than the third traffic-state threshold TT3. The external device ED of the traffic infrastructure system TS is configured to obtain the third areas where human-powered vehicles HP are moving and/or stopping based on the human-powered vehicle traffic data of the traffic information.

The condition includes a fourth traffic-state condition that a fourth distance TD4 defined from the control device 10 to an area which is within a predetermined distance from the control device 10 among fourth areas where pedestrians PD are moving and/or stopping is equal to or shorter than the fourth traffic-state threshold TT4. The external device ED of the traffic infrastructure system TS is configured to obtain the fourth areas where pedestrians PD are moving and/or stopping based on the human-powered vehicle traffic data of the traffic information.

The condition includes a fifth traffic-state condition that a fifth distance TD5 defined from the control device 10 to an area which is within a predetermined distance from the control device 10 among fifth areas where road surface conditions are not suitable for the human-powered vehicle 2 is equal to or shorter than the fifth traffic-state threshold TT5. The external device ED of the traffic infrastructure system TS is configured to obtain the fifth areas where road surface conditions are not suitable for the human-powered vehicle 2 based on the road surface condition data of the traffic information.

The condition includes a sixth traffic-state condition that a sixth distance TD6 defined from the control device 10 to an area which is within a predetermined distance from the control device 10 among sixth areas where specific events such as physical contact between entities are occurring is equal to or shorter than the sixth traffic-state threshold TT6. The external device ED of the traffic infrastructure system TS is configured to obtain the sixth areas where specific events such as physical contacts between entities are occurring based on the occurrence data of the traffic information.

The electronic controller 20C is configured to determine whether the driving-environment information meets at least one of the first to sixth traffic-state conditions based on the driving-environment information. The electronic controller 20C is configured to determine whether the first distance TD1 is equal to or shorter than the first traffic-state threshold TT1. The electronic controller 20C is configured to determine whether the second distance TD2 is equal to or shorter than the second traffic-state threshold TT2. The electronic controller 20C is configured to determine whether the third distance TD3 is equal to or shorter than the third traffic-state threshold TT3. The electronic controller 20C is configured to determine whether the fourth distance TD4 is equal to or shorter than the fourth traffic-state threshold TT4. The electronic controller 20C is configured to determine whether the fifth distance TD5 is equal to or shorter than the fifth traffic-state threshold TT5. The electronic controller 20C is configured to determine whether the sixth distance TD6 is equal to or shorter than the sixth traffic-state threshold TT6.

The electronic controller 20C is configured to control the communicator 20W to wirelessly transmit, to the informing unit IU, a traffic-state condition signal indicating that the traffic information meets the condition. The informing unit IU is configured to inform the user, based on the traffic-state condition signal, that the traffic information meets the condition. For example, the traffic-state condition signal includes a first traffic-state condition signal, a second traffic-state condition signal, a third traffic-state condition signal, a fourth traffic-state condition signal, a fifth traffic-state condition signal, and a sixth traffic-state condition signal.

The electronic controller 20C is configured to control the communicator 20W to wirelessly transmit, to the informing unit IU, the first traffic-state condition signal indicating that the first distance TD1 is equal to or shorter than the first traffic-state threshold TT1. The informing unit IU is configured to inform the user, based on the first traffic-state condition signal, that the first distance TD1 is equal to or shorter than the first traffic-state threshold TT1. The electronic controller 26C is configured to control the display 26F to display that the first distance TD1 is equal to or shorter than the first traffic-state threshold TT1. The electronic controller 26C can be configured to control the display 26F to display warnings indicating that the first distance TD1 is equal to or shorter than the first traffic-state threshold TT1. The electronic controller 26C can be configured to control a light emitter to emit light indicating that the first distance TD1 is equal to or shorter than the first traffic-state threshold TT1 in a case where the informing unit IU includes the light emitter. The electronic controller 26C can be configured to control a loudspeaker to emit a sound indicating that the first distance TD1 is equal to or shorter than the first traffic-state threshold TT1 in a case where the informing unit IU includes the loudspeaker. The electronic controller 26C can be configured to control a vibrator to generate vibration indicating that the first distance TD1 is equal to or shorter than the first traffic-state threshold TT1 in a case where the informing unit IU includes the vibrator.

The electronic controller 20C is configured to control the communicator 20W to wirelessly transmit, to the informing unit IU, the second traffic-state condition signal indicating that the second distance TD2 is equal to or below the second traffic-state threshold TT2. The informing unit IU is configured to inform the user, based on the second traffic-state condition signal, that the second distance TD2 is equal to or shorter than the second traffic-state threshold TT2. The electronic controller 26C is configured to control the display 26F to display that the second distance TD2 is equal to or shorter than the second traffic-state threshold TT2. The electronic controller 26C can be configured to control the display 26F to display warnings indicating that the second distance TD2 is equal to or shorter than the second traffic-state threshold TT2. The electronic controller 26C can be configured to control a light emitter to emit light indicating that the second distance TD2 is equal to or shorter than the second traffic-state threshold TT2 in a case where the informing unit IU includes the light emitter. The electronic controller 26C can be configured to control a loudspeaker to emit a sound indicating that the second distance TD2 is equal to or shorter than the second traffic-state threshold TT2 in a case where the informing unit IU includes the loudspeaker. The electronic controller 26C can be configured to control a vibrator to generate vibration indicating that the second distance TD2 is equal to or shorter than the second traffic-state threshold TT2 in a case where the informing unit IU includes the vibrator.

The electronic controller 20C is configured to control the communicator 20W to wirelessly transmit, to the informing unit IU, the third traffic-state condition signal indicating that the third distance TD3 is equal to or below the third traffic-state threshold TT3. The informing unit IU is configured to inform the user, based on the third traffic-state condition signal, that the third distance TD3 is equal to or shorter than the third traffic-state threshold TT3. The electronic controller 26C is configured to control the display 26F to display that the third distance TD3 is equal to or shorter than the third traffic-state threshold TT3. The electronic controller 26C can be configured to control the display 26F to display warnings indicating that the third distance TD3 is equal to or shorter than the third traffic-state threshold TT3. The electronic controller 26C can be configured to control a light emitter to emit light indicating that the third distance TD3 is equal to or shorter than the third traffic-state threshold TT3 in a case where the informing unit IU includes the light emitter. The electronic controller 26C can be configured to control a loudspeaker to emit a sound indicating that the third distance TD3 is equal to or shorter than the third traffic-state threshold TT3 in a case where the informing unit IU includes the loudspeaker. The electronic controller 26C can be configured to control a vibrator to generate vibration indicating that the third distance TD3 is equal to or shorter than the third traffic-state threshold TT3 in a case where the informing unit IU includes the vibrator.

The electronic controller 20C is configured to control the communicator 20W to wirelessly transmit, to the informing unit IU, the fourth traffic-state condition signal indicating that the fourth distance TD4 is equal to or below the fourth traffic-state threshold TT4. The informing unit IU is configured to inform the user, based on the fourth traffic-state condition signal, that the fourth distance TD4 is equal to or shorter than the fourth traffic-state threshold TT4. The electronic controller 26C is configured to control the display 26F to display that the fourth distance TD4 is equal to or shorter than the fourth traffic-state threshold TT4. The electronic controller 26C can be configured to control the display 26F to display warnings indicating that the fourth distance TD4 is equal to or shorter than the fourth traffic-state threshold TT4. The electronic controller 26C can be configured to control a light emitter to emit light indicating that the fourth distance TD4 is equal to or shorter than the fourth traffic-state threshold TT4 in a case where the informing unit IU includes the light emitter. The electronic controller 26C can be configured to control a loudspeaker to emit a sound indicating that the fourth distance TD4 is equal to or shorter than the fourth traffic-state threshold TT4 in a case where the informing unit IU includes the loudspeaker. The electronic controller 26C can be configured to control a vibrator to generate vibration indicating that the fourth distance TD4 is equal to or shorter than the fourth traffic-state threshold TT4 in a case where the informing unit IU includes the vibrator.

The electronic controller 20C is configured to control the communicator 20W to wirelessly transmit, to the informing unit IU, the fifth traffic-state condition signal indicating that the fifth distance TD5 is equal to or below the fifth traffic-state threshold TT5. The informing unit IU is configured to inform the user, based on the fifth traffic-state condition signal, that the fifth distance TD5 is equal to or shorter than the fifth traffic-state threshold TT5. The electronic controller 26C is configured to control the display 26F to display that the fifth distance TD5 is equal to or shorter than the fifth traffic-state threshold TT5. The electronic controller 26C can be configured to control the display 26F to display warnings indicating that the fifth distance TD5 is equal to or shorter than the fifth traffic-state threshold TT5. The electronic controller 26C can be configured to control a light emitter to emit light indicating that the fifth distance TD5 is equal to or shorter than the fifth traffic-state threshold TT5 in a case where the informing unit IU includes the light emitter. The electronic controller 26C can be configured to control a loudspeaker to emit a sound indicating that the fifth distance TD5 is equal to or shorter than the fifth traffic-state threshold TT5 in a case where the informing unit IU includes the loudspeaker. The electronic controller 26C can be configured to control a vibrator to generate vibration indicating that the fifth distance TD5 is equal to or shorter than the fifth traffic-state threshold TT5 in a case where the informing unit IU includes the vibrator.

The electronic controller 20C is configured to control the communicator 20W to wirelessly transmit, to the informing unit IU, the sixth traffic-state condition signal indicating that the sixth distance TD6 is equal to or below the sixth traffic-state threshold TT6. The informing unit IU is configured to inform the user, based on the sixth traffic-state condition signal, that the sixth distance TD6 is equal to or shorter than the sixth traffic-state threshold TT6. The electronic controller 26C is configured to control the display 26F to display that the sixth distance TD6 is equal to or shorter than the sixth traffic-state threshold TT6. The electronic controller 26C can be configured to control the display 26F to display warnings indicating that the sixth distance TD6 is equal to or shorter than the sixth traffic-state threshold TT6. The electronic controller 26C can be configured to control a light emitter to emit light indicating that the sixth distance TD6 is equal to or shorter than the sixth traffic-state threshold TT6 in a case where the informing unit IU includes the light emitter. The electronic controller 26C can be configured to control a loudspeaker to emit a sound indicating that the sixth distance TD6 is equal to or shorter than the sixth traffic-state threshold TT6 in a case where the informing unit IU includes the loudspeaker. The electronic controller 26C can be configured to control a vibrator to generate vibration indicating that the sixth distance TD6 is equal to or shorter than the sixth traffic-state threshold TT6 in a case where the informing unit IU includes the vibrator.

As seen in FIG. 4, the electronic controller 20C is configured to conclude that the road object information meets the road object condition if a road object distance defined from the control device 10 to a road object which is included in the road object information and which is within a predetermined distance from the control device 10 is equal to or below the road object threshold.

The electronic controller 20C is configured to store the road object threshold in the computer memory 20M. In the present embodiment, the road object threshold includes a first road object threshold and a second road object threshold. The electronic controller 20C is configured to store the first and second road object thresholds OT1 and OT2 in the computer memory 20M. At least one of the first and second road object thresholds OT1 and OT2 can be changed via a user interface device such as a cyclocomputer, a smartphone, a smartwatch, a tablet computer, and a personal computer. The road object threshold can be equal to or greater than zero. At least one of the first and second road object thresholds OT1 and OT2 can be equal to or greater than zero.

For example, the condition includes a first road object condition that a first road object distance OD1 defined from the control device 10 to a parked vehicle which is parked on a roadway and which is within a predetermined distance from the control device 10 is equal to or below the first road object threshold OT1. The external device ED of the traffic infrastructure system TS is configured to obtain the parked vehicle based on geographical positions of parked vehicles VH included in the road object information.

The condition includes a second road object condition that a second road object distance OD2 defined from the control device 10 to a non-living or living object which is on a roadway and which is within a predetermined distance from the control device 10 is equal to or below the second road object threshold OT2. The external device ED of the traffic infrastructure system TS is configured to obtain the non-living or living object based on geographical positions of non-living objects and living objects included in the road object information.

The electronic controller 20C is configured to control the communicator 20W to wirelessly transmit, to the informing unit IU, a road object condition signal indicating that the road object information meets the condition. The informing unit IU is configured to inform the user, based on the road object condition signal, that the road object information meets the condition. For example, the road object condition signal includes a first road object condition signal and a second road object condition signal.

The electronic controller 20C is configured to control the communicator 20W to wirelessly transmit, to the informing unit IU, the first road object condition signal indicating that the first road object distance OD1 is equal to or below the first road object threshold OT1. The informing unit IU is configured to inform the user, based on the first road object condition signal, that the first road object distance OD1 is equal to or shorter than the first road object threshold OT1. The electronic controller 26C is configured to control the display 26F to display that the first road object distance OD1 is equal to or shorter than the first road object threshold OT1. The electronic controller 26C can be configured to control the display 26F to display warnings indicating that the first road object distance OD1 is equal to or shorter than the first road object threshold OT1. The electronic controller 26C can be configured to control a light emitter to emit light indicating that the first road object distance OD1 is equal to or shorter than the first road object threshold OT1 in a case where the informing unit IU includes the light emitter. The electronic controller 26C can be configured to control a loudspeaker to emit a sound indicating that the first road object distance OD1 is equal to or shorter than the first road object threshold OT1 in a case where the informing unit IU includes the loudspeaker. The electronic controller 26C can be configured to control a vibrator to generate vibration indicating that the first road object distance OD1 is equal to or shorter than the first road object threshold OT1 in a case where the informing unit IU includes the vibrator.

The electronic controller 20C is configured to control the communicator 20W to wirelessly transmit, to the informing unit IU, the second road object condition signal indicating that the second road object distance OD2 is equal to or below the second road object threshold OT2. The informing unit IU is configured to inform the user, based on the second road object condition signal, that the second road object distance OD2 is equal to or shorter than the second road object threshold OT2. The electronic controller 26C is configured to control the display 26F to display that the second road object distance OD2 is equal to or shorter than the second road object threshold OT2. The electronic controller 26C can be configured to control the display 26F to display warnings indicating that the second road object distance OD2 is equal to or shorter than the second road object threshold OT2. The electronic controller 26C can be configured to control a light emitter to emit light indicating that the second road object distance OD2 is equal to or shorter than the second road object threshold OT2 in a case where the informing unit IU includes the light emitter. The electronic controller 26C can be configured to control a loudspeaker to emit a sound indicating that the second road object distance OD2 is equal to or shorter than the second road object threshold OT2 in a case where the informing unit IU includes the loudspeaker. The electronic controller 26C can be configured to control a vibrator to generate vibration indicating that the second road object distance OD2 is equal to or shorter than the second road object threshold OT2 in a case where the informing unit IU includes the vibrator.

As seen in FIG. 4, the electronic controller 20C of the control device 10 is configured to control the assist driving unit DU based on the driving-environment information. The electronic controller 20C is configured to control the assist driving unit DU to change the assist ratio if the traffic information is equal to or below the traffic-state threshold. The electronic controller 20C is configured to control the assist driving unit DU to decrease the assist ratio if the traffic information is equal to or below the traffic-state threshold. For example, the electronic controller 20C is configured to control the assist driving unit DU to decrease the assist ratio from the third assist ratio to the second assist ratio if the traffic information is equal to or below the traffic-state threshold in a state where the assist ratio is the third assist ratio. The electronic controller 20C is configured to control the assist driving unit DU to decrease the assist ratio from the second assist ratio to the first assist ratio if the traffic information is equal to or below the traffic-state threshold in a state where the assist ratio is the second assist ratio. The electronic controller 20C is configured to control the assist driving unit DU to maintain the first assist ratio if the traffic information is equal to or below the traffic-state threshold in a state where the assist ratio is the first assist ratio.

For example, the electronic controller 20C is configured to control the assist driving unit DU to change the assist ratio if the first distance TD1 is equal to or shorter than the first traffic-state threshold TT1. The electronic controller 20C is configured to control the assist driving unit DU to decrease the assist ratio if the first distance TD1 is equal to or shorter than the first traffic-state threshold TT1.

The electronic controller 20C is configured to control the assist driving unit DU to change the assist ratio if the second distance TD2 is equal to or shorter than the second traffic-state threshold TT2. The electronic controller 20C is configured to control the assist driving unit DU to decrease the assist ratio if the second distance TD2 is equal to or shorter than the second traffic-state threshold TT2.

The electronic controller 20C is configured to control the assist driving unit DU to change the assist ratio if the third distance TD3 is equal to or shorter than the third traffic-state threshold TT3. The electronic controller 20C is configured to control the assist driving unit DU to decrease the assist ratio if the third distance TD3 is equal to or shorter than the third traffic-state threshold TT3.

The electronic controller 20C is configured to control the assist driving unit DU to change the assist ratio if the fourth distance TD4 is equal to or shorter than the fourth traffic-state threshold TT4. The electronic controller 20C is configured to control the assist driving unit DU to decrease the assist ratio if the fourth distance TD4 is equal to or shorter than the fourth traffic-state threshold TT4.

The electronic controller 20C is configured to control the assist driving unit DU to change the assist ratio if the fifth distance TD5 is equal to or shorter than the fifth traffic-state threshold TT5. The electronic controller 20C is configured to control the assist driving unit DU to decrease the assist ratio if the fifth distance TD5 is equal to or shorter than the fifth traffic-state threshold TT5.

The electronic controller 20C is configured to control the assist driving unit DU to change the assist ratio if the sixth distance TD6 is equal to or shorter than the sixth traffic-state threshold TT6. The electronic controller 20C is configured to control the assist driving unit DU to decrease the assist ratio if the sixth distance TD6 is equal to or shorter than the sixth traffic-state threshold TT6.

The electronic controller 20C is configured to control the assist driving unit DU to change the assist ratio if the road object distance defined from the control device 10 to a road object which is included in the road object information and which is within a predetermined distance from the control device 10 is equal to or below the road object threshold. The electronic controller 20C is configured to control the assist driving unit DU to decrease the assist ratio if the road object distance is equal to or below the road object threshold. For example, the electronic controller 20C is configured to control the assist driving unit DU to decrease the assist ratio from the third assist ratio to the second assist ratio if the road object distance is equal to or below the road object threshold in a state where the assist ratio is the third assist ratio. The electronic controller 20C is configured to control the assist driving unit DU to decrease the assist ratio from the second assist ratio to the first assist ratio if the road object distance is equal to or below the road object threshold in a state where the assist ratio is the second assist ratio. The electronic controller 20C is configured to control the assist driving unit DU to maintain the first assist ratio if the road object distance is equal to or below the road object threshold in a state where the assist ratio is the first assist ratio.

For example, the electronic controller 20C is configured to control the assist driving unit DU to change the assist ratio if the first road object distance OD1 is equal to or below the first road object threshold OT1. The electronic controller 20C is configured to control the assist driving unit DU to decrease the assist ratio if the first road object distance OD1 is equal to or below the first road object threshold OT1.

The electronic controller 20C is configured to control the assist driving unit DU to change the assist ratio if the second road object distance OD2 is equal to or below the second road object threshold OT2. The electronic controller 20C is configured to control the assist driving unit DU to decrease the assist ratio if the second road object distance OD2 is equal to or below the second road object threshold OT2.

As seen in FIG. 4, the electronic controller 20C of the control device 10 is configured to control the gear-changing device RD based on the driving-environment information. The electronic controller 20C is configured to control the gear-changing device RD to change a gear ratio if the traffic information is equal to or below the traffic-state threshold. The electronic controller 20C is configured to control the gear-changing device RD to downshift if the traffic information is equal to or below the traffic-state threshold. For example, the electronic controller 20C is configured to control the gear-changing device RD to downshift by one gear stage if the traffic information is equal to or below the traffic-state threshold in a state where the current gear state is not the lowest gear. The electronic controller 20C is configured to control the gear-changing device RD to maintain the current gear stage if the traffic information is equal to or below the traffic-state threshold in a state where the current gear state is the lowest gear.

For example, the electronic controller 20C is configured to control the gear-changing device RD to change the gear ratio if the first distance TD1 is equal to or shorter than the first traffic-state threshold TT1. The electronic controller 20C is configured to control the gear-changing device RD to downshift if the first distance TD1 is equal to or shorter than the first traffic-state threshold TT1.

The electronic controller 20C is configured to control the gear-changing device RD to change the gear ratio if the second distance TD2 is equal to or shorter than the second traffic-state threshold TT2. The electronic controller 20C is configured to control the gear-changing device RD to downshift if the second distance TD2 is equal to or shorter than the second traffic-state threshold TT2.

The electronic controller 20C is configured to control the gear-changing device RD to change the gear ratio if the third distance TD3 is equal to or shorter than the third traffic-state threshold TT3. The electronic controller 20C is configured to control the gear-changing device RD to downshift if the third distance TD3 is equal to or shorter than the third traffic-state threshold TT3.

The electronic controller 20C is configured to control the gear-changing device RD to change the gear ratio if the fourth distance TD4 is equal to or shorter than the fourth traffic-state threshold TT4. The electronic controller 20C is configured to control the gear-changing device RD to downshift if the fourth distance TD4 is equal to or shorter than the fourth traffic-state threshold TT4.

The electronic controller 20C is configured to control the gear-changing device RD to change the gear ratio if the fifth distance TD5 is equal to or shorter than the fifth traffic-state threshold TT5. The electronic controller 20C is configured to control the gear-changing device RD to downshift if the fifth distance TD5 is equal to or shorter than the fifth traffic-state threshold TT5.

The electronic controller 20C is configured to control the gear-changing device RD to change the gear ratio if the sixth distance TD6 is equal to or shorter than the sixth traffic-state threshold TT6. The electronic controller 20C is configured to control the gear-changing device RD to downshift if the sixth distance TD6 is equal to or shorter than the sixth traffic-state threshold TT6.

The electronic controller 20C is configured to control the gear-changing device RD to change a gear ratio if a road object distance defined from the control device 10 to a road object which is included in the road object information and which is within a predetermined distance from the control device 10 is equal to or below the road object threshold. The electronic controller 20C is configured to control the gear-changing device RD to downshift if the road object distance is equal to or below the road object threshold. For example, the electronic controller 20C is configured to control the gear-changing device RD to downshift by at least one gear stage if the road object distance is equal to or below the road object threshold in a state where the current gear state is not the lowest gear. The electronic controller 20C can be configured to control the gear-changing device RD to downshift gradually by at least two gear stages. The electronic controller 20C is configured to control the gear-changing device RD to maintain the current gear stage if the road object distance is equal to or below the road object threshold in a state where the current gear state is the lowest gear.

For example, the electronic controller 20C is configured to control the gear-changing device RD to change the gear ratio if the first road object distance OD1 is equal to or below the first road object threshold OT1. The electronic controller 20C is configured to control the gear-changing device RD to downshift if the first road object distance OD1 is equal to or below the first road object threshold OT1.

The electronic controller 20C is configured to control the gear-changing device RD to change the gear ratio if the second road object distance OD2 is equal to or below the second road object threshold OT2. The electronic controller 20C is configured to control the gear-changing device RD to downshift if the second road object distance OD2 is equal to or below the second road object threshold OT2.

As seen in FIG. 4, the electronic controller 20C of the control device 10 is configured to control the braking device BD based on the driving-environment information. The electronic controller 20C is configured to control the braking device BD to change braking force if the traffic information is equal to or below the traffic-state threshold. The electronic controller 20C is configured to control the braking device BD to increase the braking force if the traffic information is equal to or below the traffic-state threshold. For example, the electronic controller 20C is configured to control the braking device BD to increase the braking force to a predetermined level (e.g., 60% to 80% of the maximum level) if the traffic information is equal to or below the traffic-state threshold.

For example, the electronic controller 20C is configured to control the braking device BD to change the braking force if the first distance TD1 is equal to or shorter than the first traffic-state threshold TT1. The electronic controller 20C is configured to control the braking device BD to increase the braking force if the first distance TD1 is equal to or shorter than the first traffic-state threshold TT1.

The electronic controller 20C is configured to control the braking device BD to change the braking force if the second distance TD2 is equal to or shorter than the second traffic-state threshold TT2. The electronic controller 20C is configured to control the braking device BD to increase the braking force if the second distance TD2 is equal to or shorter than the second traffic-state threshold TT2.

The electronic controller 20C is configured to control the braking device BD to change the braking force if the third distance TD3 is equal to or shorter than the third traffic-state threshold TT3. The electronic controller 20C is configured to control the braking device BD to increase the braking force if the third distance TD3 is equal to or shorter than the third traffic-state threshold TT3.

The electronic controller 20C is configured to control the braking device BD to change the braking force if the fourth distance TD4 is equal to or shorter than the fourth traffic-state threshold TT4. The electronic controller 20C is configured to control the braking device BD to increase the braking force if the fourth distance TD4 is equal to or shorter than the fourth traffic-state threshold TT4.

The electronic controller 20C is configured to control the braking device BD to change the braking force if the fifth distance TD5 is equal to or shorter than the fifth traffic-state threshold TT5. The electronic controller 20C is configured to control the braking device BD to increase the braking force if the fifth distance TD5 is equal to or shorter than the fifth traffic-state threshold TT5.

The electronic controller 20C is configured to control the braking device BD to change the braking force if the sixth distance TD6 is equal to or shorter than the sixth traffic-state threshold TT6. The electronic controller 20C is configured to control the braking device BD to increase the braking force if the sixth distance TD6 is equal to or shorter than the sixth traffic-state threshold TT6.

The electronic controller 20C is configured to control the braking device BD to change braking force if a road object distance defined from the control device 10 to a road object which is included in the road object information and which is within a predetermined distance from the control device 10 is equal to or below the road object threshold. The electronic controller 20C is configured to control the braking device BD to increase the braking force if the road object distance is equal to or below the road object threshold.

For example, the electronic controller 20C is configured to control the braking device BD to change the braking force if the first road object distance OD1 is equal to or below the first road object threshold OT1. The electronic controller 20C is configured to control the braking device BD to increase the braking force if the first road object distance OD1 is equal to or below the first road object threshold OT1.

The electronic controller 20C is configured to control the braking device BD to change the braking force if the second road object distance OD2 is equal to or below the second road object threshold OT2. The electronic controller 20C is configured to control the braking device BD to increase the braking force if the second road object distance OD2 is equal to or below the second road object threshold OT2.

As seen in FIG. 4, the electronic controller 20C of the control device 10 is configured to control the rider-posture changing device AS based on the driving-environment information. The electronic controller 20C is configured to control the rider-posture changing device AS to change a state of the rider-posture changing device AS if the traffic information is equal to or below the traffic-state threshold. For example, changing the state of the rider-posture changing device AS can include changing the state of the rider-posture changing device AS to a predetermined state and changing the relative position between the first member AS3 and the second member AS4 to change the position of the seat 2B relative to the vehicle body 2V. In the present embodiment, the electronic controller 20C is configured to control the rider-posture changing device AS to change the state of the rider-posture changing device AS to a predetermined state if the traffic information is equal to or below the traffic-state threshold.

For example, the electronic controller 20C is configured to control the rider-posture changing device AS to change the state of the rider-posture changing device AS from the lock state to the adjustable state for a predetermined time period if the traffic information is equal to or below the traffic-state threshold. To make the rider's posture stable, the position of the seat 2B is adjustable relative to the vehicle body 2V using the weight of the user while the rider-posture changing device AS is in the adjustable state. The electronic controller 20C can be configured to control the rider-posture changing device AS to change the state of the rider-posture changing device AS from the lock state to the adjustable state while the traffic information is equal to or below the traffic-state threshold. Furthermore, the electronic controller 20C can be configured to control the rider-posture changing device AS to change the position of the seat 2B to a predetermined position (e.g., a middle position, a standard position) if the traffic information is equal to or below the traffic-state threshold. Changing the state of the rider-posture changing device AS includes changing the relative position between the first member AS3 and the second member AS4 to change the position of the seat 2B relative to the vehicle body 2V.

For example, the electronic controller 20C is configured to control the rider-posture changing device AS to change the state of the rider-posture changing device AS if the first distance TD1 is equal to or shorter than the first traffic-state threshold TT1. The electronic controller 20C is configured to control the rider-posture changing device AS to change the state of the rider-posture changing device AS to the predetermined state if the first distance TD1 is equal to or shorter than the first traffic-state threshold TT1.

The electronic controller 20C is configured to control the rider-posture changing device AS to change the state of the rider-posture changing device AS if the second distance TD2 is equal to or shorter than the second traffic-state threshold TT2. The electronic controller 20C is configured to control the rider-posture changing device AS to change the state of the rider-posture changing device AS to the predetermined state if the second distance TD2 is equal to or shorter than the second traffic-state threshold TT2.

The electronic controller 20C is configured to control the rider-posture changing device AS to change the state of the rider-posture changing device AS if the third distance TD3 is equal to or shorter than the third traffic-state threshold TT3. The electronic controller 20C is configured to control the rider-posture changing device AS to change the state of the rider-posture changing device AS to the predetermined state if the third distance TD3 is equal to or shorter than the third traffic-state threshold TT3.

The electronic controller 20C is configured to control the rider-posture changing device AS to change the state of the rider-posture changing device AS if the fourth distance TD4 is equal to or shorter than the fourth traffic-state threshold TT4. The electronic controller 20C is configured to control the rider-posture changing device AS to change the state of the rider-posture changing device AS to the predetermined state if the fourth distance TD4 is equal to or shorter than the fourth traffic-state threshold TT4.

The electronic controller 20C is configured to control the rider-posture changing device AS to change the state of the rider-posture changing device AS if the fifth distance TD5 is equal to or shorter than the fifth traffic-state threshold TT5. The electronic controller 20C is configured to control the rider-posture changing device AS to change the state of the rider-posture changing device AS to the predetermined state if the fifth distance TD5 is equal to or shorter than the fifth traffic-state threshold TT5.

The electronic controller 20C is configured to control the rider-posture changing device AS to change the state of the rider-posture changing device AS if the sixth distance TD6 is equal to or shorter than the sixth traffic-state threshold TT6. The electronic controller 20C is configured to control the rider-posture changing device AS to change the state of the rider-posture changing device AS to the predetermined state if the sixth distance TD6 is equal to or shorter than the sixth traffic-state threshold TT6.

The electronic controller 20C is configured to control the rider-posture changing device AS to change a state of the rider-posture changing device AS if a road object distance defined from the control device 10 to a road object which is included in the road object information and which is within a predetermined distance from the control device 10 is equal to or below a road object threshold. The electronic controller 20C is configured to control the rider-posture changing device AS to change the state of the rider-posture changing device AS to a predetermined state if the road object distance is equal to or below the road object threshold.

For example, the electronic controller 20C is configured to control the rider-posture changing device AS to change the state of the rider-posture changing device AS if the first road object distance OD1 is equal to or below the first road object threshold OT1. The electronic controller 20C is configured to control the rider-posture changing device AS to change the state of the rider-posture changing device AS to the predetermined state if the first road object distance OD1 is equal to or below the first road object threshold OT1.

The electronic controller 20C is configured to control the rider-posture changing device AS to change the state of the rider-posture changing device AS if the second road object distance OD2 is equal to or below the second road object threshold OT2. The electronic controller 20C is configured to control the rider-posture changing device AS to change the state of the rider-posture changing device AS to the predetermined state if the second road object distance OD2 is equal to or below the second road object threshold OT2.

As seen in FIG. 4, the electronic controller 20C of the control device 10 is configured to control the light emitting device LE based on the driving-environment information. The electronic controller 20C is configured to control the light emitting device LE to change a state of the light emitting device LE if the traffic information is equal to or below the traffic-state threshold. The electronic controller 20C is configured to control the light emitting device LE to change the state of the light emitting device LE to a predetermined state if the traffic information is equal to or below the traffic-state threshold.

For example, the electronic controller 20C is configured to control the light emitting device LE to change the state of the light emitting device LE if the first distance TD1 is equal to or shorter than the first traffic-state threshold TT1. The electronic controller 20C is configured to control the light emitting device LE to change the state of the light emitting device LE to the predetermined state if the first distance TD1 is equal to or shorter than the first traffic-state threshold TT1.

The electronic controller 20C is configured to control the light emitting device LE to change the state of the light emitting device LE if the second distance TD2 is equal to or shorter than the second traffic-state threshold TT2. The electronic controller 20C is configured to control the light emitting device LE to change the state of the light emitting device LE to the predetermined state if the second distance TD2 is equal to or shorter than the second traffic-state threshold TT2.

The electronic controller 20C is configured to control the light emitting device LE to change the state of the light emitting device LE if the third distance TD3 is equal to or shorter than the third traffic-state threshold TT3. The electronic controller 20C is configured to control the light emitting device LE to change the state of the light emitting device LE to the predetermined state if the third distance TD3 is equal to or shorter than the third traffic-state threshold TT3.

The electronic controller 20C is configured to control the light emitting device LE to change the state of the light emitting device LE if the fourth distance TD4 is equal to or shorter than the fourth traffic-state threshold TT4. The electronic controller 20C is configured to control the light emitting device LE to change the state of the light emitting device LE to the predetermined state if the fourth distance TD4 is equal to or shorter than the fourth traffic-state threshold TT4.

The electronic controller 20C is configured to control the light emitting device LE to change the state of the light emitting device LE if the fifth distance TD5 is equal to or shorter than the fifth traffic-state threshold TT5. The electronic controller 20C is configured to control the light emitting device LE to change the state of the light emitting device LE to the predetermined state if the fifth distance TD5 is equal to or shorter than the fifth traffic-state threshold TT5.

The electronic controller 20C is configured to control the light emitting device LE to change the state of the light emitting device LE if the sixth distance TD6 is equal to or shorter than the sixth traffic-state threshold TT6. The electronic controller 20C is configured to control the light emitting device LE to change the state of the light emitting device LE to the predetermined state if the sixth distance TD6 is equal to or shorter than the sixth traffic-state threshold TT6.

The electronic controller 20C is configured to control the light emitting device LE to change a state of the light emitting device LE if the road object distance defined from the control device 10 to a road object which is included in the road object information and which is within a predetermined distance from the control device 10 is equal to or below the road object threshold. The electronic controller 20C is configured to control the light emitting device LE to change the state of the light emitting device LE to a predetermined state if the road object distance is equal to or below the road object threshold. For example, the predetermined state of the light emitting device LE includes a normal light, a blink, and a high beam. The electronic controller 20C is configured to control the light emitting device LE to change the state of the light emitting device LE from a no-lighting state to the predetermined state (e.g., the normal light, the blink, or the high beam) if the road object distance is equal to or below the road object threshold. The electronic controller 20C is configured to control the light emitting device LE to change the state of the light emitting device LE from a lighting state to the predetermined state (e.g., the blink or the high beam) if the road object distance is equal to or below the road object threshold. For example, the electronic controller 20C is configured to control the light emitting device LE to change the state of the light emitting device LE between a first state (e.g., one of the normal light, the blink, the high beam, the low beam, and any combination thereof) and a second state (e.g., another of the normal light, the blink, the high beam, the low beam, and any combination thereof) if the road object distance is equal to or below the road object threshold. The light emitting device LE can include a tale lamp. In such embodiments, the electronic controller 20C can be configured to control the light emitting device LE to continuously blink to entities (e.g., vehicles, motorcycles, human-powered vehicles, and/or pedestrians) behind the human-powered vehicle 2 in order to pay their attention to the human-powered vehicle 2.

For example, the electronic controller 20C is configured to control the light emitting device LE to change the state of the light emitting device LE if the first road object distance OD1 is equal to or below the first road object threshold OT1. The electronic controller 20C is configured to control the light emitting device LE to change the state of the light emitting device LE to the predetermined state if the first road object distance OD1 is equal to or below the first road object threshold OT1.

The electronic controller 20C is configured to control the light emitting device LE to change the state of the light emitting device LE if the second road object distance OD2 is equal to or below the second road object threshold OT2. The electronic controller 20C is configured to control the light emitting device LE to change the state of the light emitting device LE to the predetermined state if the second road object distance OD2 is equal to or below the second road object threshold OT2.

The control executed by the control device 10 will be described below referring to FIGS. 5 to 7.

Figure 5:
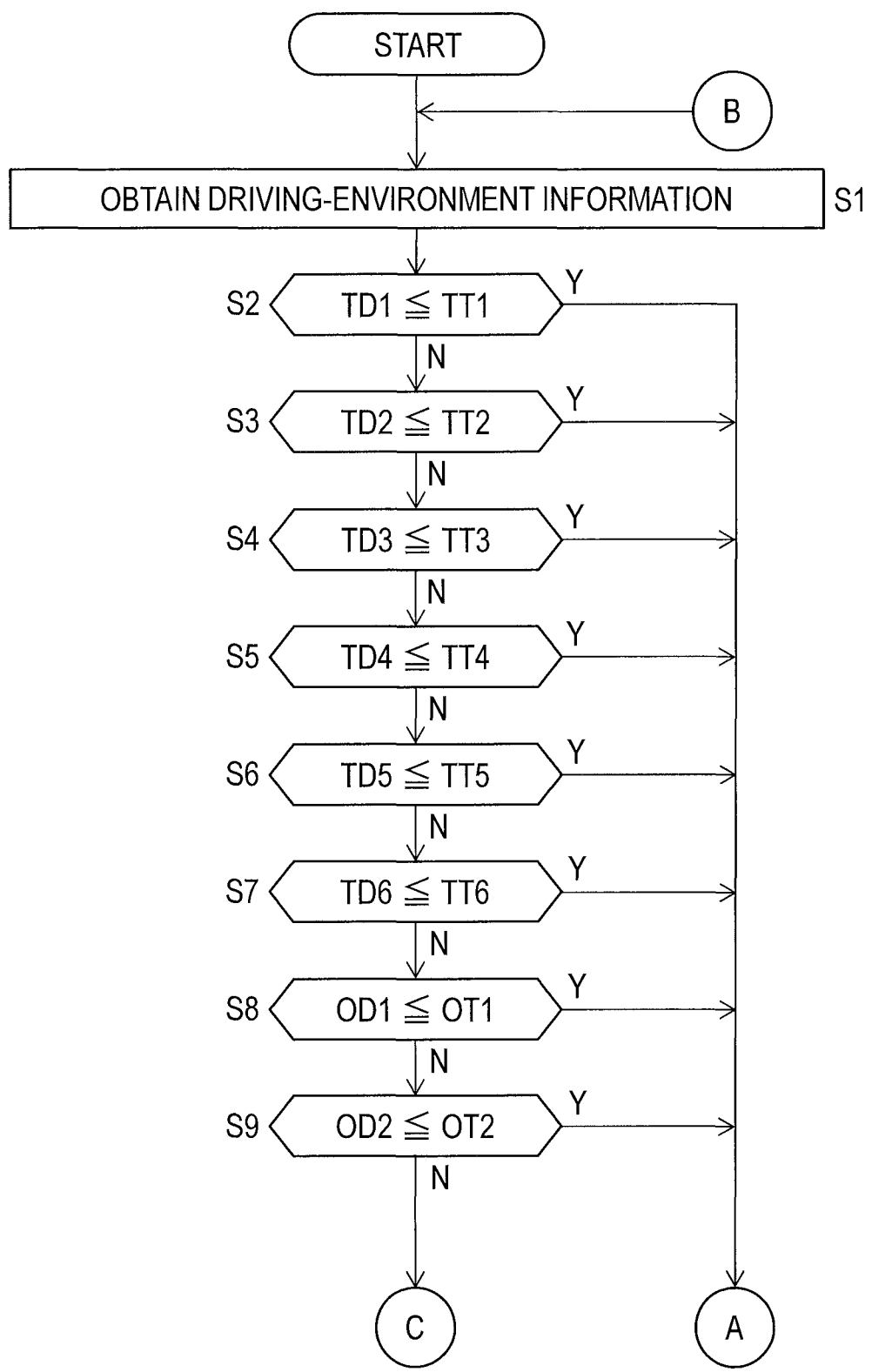
FIGS. 5 to 7 are flowcharts showing control of the control device of the human-powered vehicle illustrated in FIG. 1.

As seen in FIG. 5, the driving-environment information is obtained by the control device 10 (step S1). For example, the traffic information and the road object information are obtained by the control device 10 from the traffic infrastructure system TS. The current geographical position of the control device 10 is obtained from the global positioning receiver 32G by the electronic controller 20C. The first to sixth distances TD1 to TD6 and the first and second road object distances OD1 and OD2 are calculated by the electronic controller 20C based on the current geographical position, the traffic information, and the road object information.

It is determined by the electronic controller 20C whether the first distance TD1 is equal to or below the first traffic-state threshold TT1 (step S2). It is determined by the electronic controller 20C whether the second distance TD2 is equal to or below the second traffic-state threshold TT2 (step S3). It is determined by the electronic controller 20C whether the third distance TD3 is equal to or below the third traffic-state threshold TT3 (step S4). It is determined by the electronic controller 20C whether the fourth distance TD4 is equal to or below the fourth traffic-state threshold TT4 (step S5). It is determined by the electronic controller 20C whether the fifth distance TD5 is equal to or below the fifth traffic-state threshold TT5 (step S6). It is determined by the electronic controller 20C whether the sixth distance TD6 is equal to or below the sixth traffic-state threshold TT6 (step S7). It is determined by the electronic controller 20C whether the first road object distance OD1 is equal to or below the first road object threshold OT1 (step S8). It is determined by the electronic controller 20C whether the second road object distance OD2 is equal to or below the second road object threshold OT2 (step S9). The process proceeds to the step S10 if one of the conditions is met in the steps S2 to S9.

Figure 6:
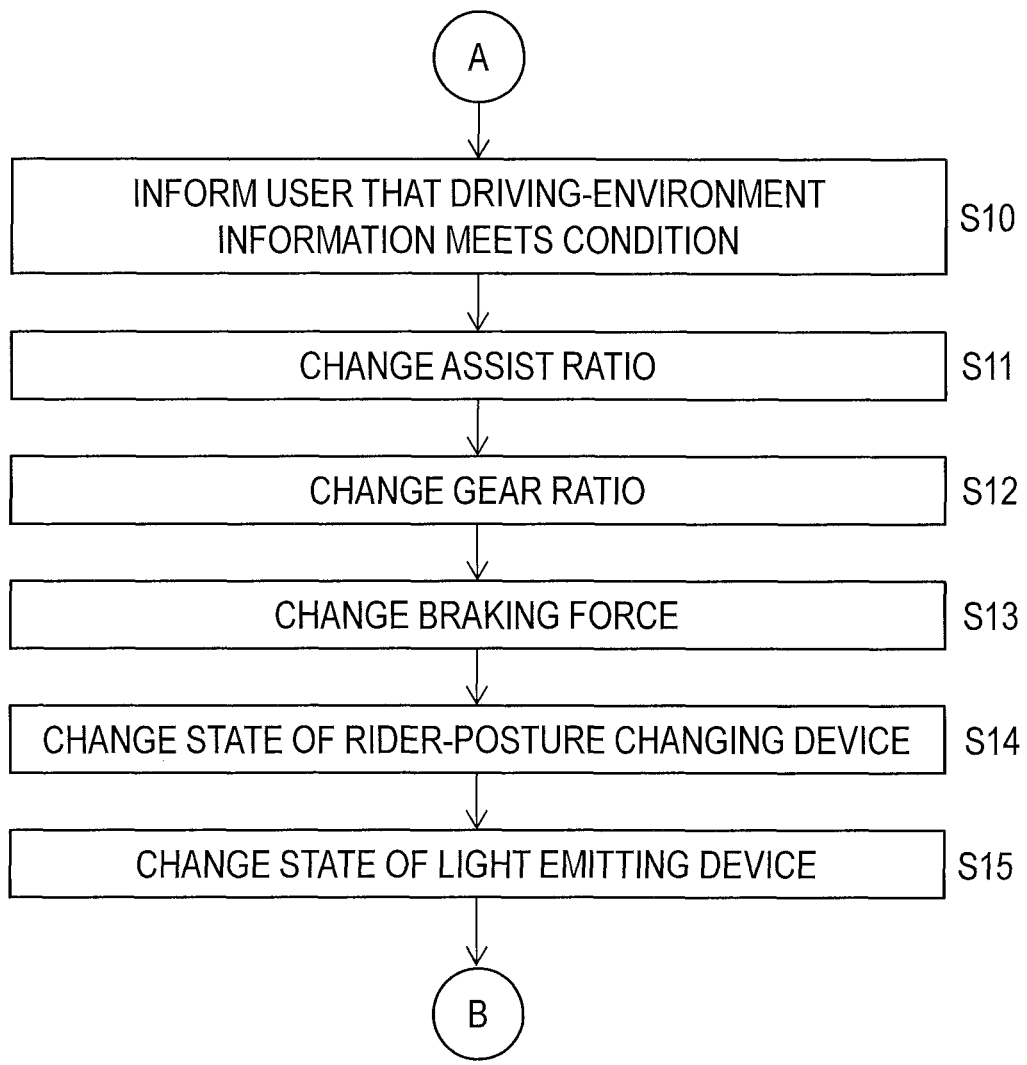

As seen in FIGS. 5 and 6, the informing unit IU informs the user that the driving-environment information meets the condition if one of the conditions is met in the steps S2 to S9 (step S10). At least one of all possible controls mentioned above regarding the informing unit IU can be executed in the step S10.

As seen in FIG. 6, for example, the electronic controller 20C controls the informing unit IU to display on the display 26F that the control device 10 and/or the human-powered vehicle 2 is approaching the red light of the traffic light TS1 if the first distance TD1 is equal to or below the first traffic-state threshold TT1. The electronic controller 20C controls the informing unit IU to display on the display 26F that the control device 10 and/or the human-powered vehicle 2 is approaching the traffic jam if the second distance TD2 is equal to or below the second traffic-state threshold TT2. The electronic controller 20C controls the informing unit IU to display on the display 26F that the control device 10 and/or the human-powered vehicle 2 is approaching another human-powered vehicle if the third distance TD3 is equal to or below the third traffic-state threshold TT3. The electronic controller 20C controls the informing unit IU to display on the display 26F that the control device 10 and/or the human-powered vehicle 2 is approaching a pedestrian if the fourth distance TD4 is equal to or below the fourth traffic-state threshold TT4. The electronic controller 20C controls the informing unit IU to display on the display 26F that the control device 10 and/or the human-powered vehicle 2 is approaching an area where a road surface condition is not suitable for the human-powered vehicle 2 if the fifth distance TD5 is equal to or below the fifth traffic-state threshold TT5. The electronic controller 20C controls the informing unit IU to display on the display 26F that the control device 10 and/or the human-powered vehicle 2 is approaching an area of an event such as a physical contact between entities if the sixth distance TD6 is equal to or below the sixth traffic-state threshold TT6.

As seen in FIGS. 5 and 6, the electronic controller 20C controls the assist driving unit DU to change the assist ratio if one of the conditions is met in the steps S2 to S9 (step S11). At least one of all possible controls mentioned above regarding the assist driving unit DU can be executed in the step S11.

As seen in FIG. 6, for example, the electronic controller 20C controls the assist driving unit DU to change (e.g., decrease) the assist ratio if the first distance TD1 is equal to or below the first traffic-state threshold TT1. The electronic controller 20C controls the assist driving unit DU to change (e.g., decrease) the assist ratio if the second distance TD2 is equal to or below the second traffic-state threshold TT2. The electronic controller 20C controls the assist driving unit DU to change (e.g., decrease) the assist ratio if the third distance TD3 is equal to or below the third traffic-state threshold TT3. The electronic controller 20C controls the assist driving unit DU to change (e.g., decrease) the assist ratio if the fourth distance TD4 is equal to or below the fourth traffic-state threshold TT4. The electronic controller 20C controls the assist driving unit DU to change (e.g., decrease) the assist ratio if the fifth distance TD5 is equal to or below the fifth traffic-state threshold TT5. The electronic controller 20C controls the assist driving unit DU to change (e.g., decrease) the assist ratio if the sixth distance TD6 is equal to or below the sixth traffic-state threshold TT6.

As seen in FIGS. 5 and 6, the electronic controller 20C controls the gear-changing device RD to change the gear ratio if one of the conditions is met in the steps S2 to S9 (step S12). At least one of all possible controls mentioned above regarding the gear-changing device RD can be executed in the step S12.

As seen in FIG. 6, for example, the electronic controller 20C controls the gear-changing device RD to change the gear ratio (e.g., downshift) if the first distance TD1 is equal to or below the first traffic-state threshold TT1. The electronic controller 20C controls the gear-changing device RD to change the gear ratio (e.g., downshift) if the second distance TD2 is equal to or below the second traffic-state threshold TT2. The electronic controller 20C controls the gear-changing device RD to change the gear ratio (e.g., downshift) if the third distance TD3 is equal to or below the third traffic-state threshold TT3. The electronic controller 20C controls the gear-changing device RD to change the gear ratio (e.g., downshift) if the fourth distance TD4 is equal to or below the fourth traffic-state threshold TT4. The electronic controller 20C controls the gear-changing device RD to change the gear ratio (e.g., downshift) if the fifth distance TD5 is equal to or below the fifth traffic-state threshold TT5. The electronic controller 20C controls the gear-changing device RD to change the gear ratio (e.g., downshift) if the sixth distance TD6 is equal to or below the sixth traffic-state threshold TT6.

As seen in FIGS. 5 and 6, the electronic controller 20C controls the braking device BD to change the braking force if one of the conditions is met in the steps S2 to S9 (step S13). At least one of all possible controls mentioned above regarding the braking device BD can be executed in the step S13.

As seen in FIG. 6, for example, the electronic controller 20C controls the braking device BD to change (e.g., increase) the braking force if the first distance TD1 is equal to or below the first traffic-state threshold TT1. The electronic controller 20C controls the braking device BD to change (e.g., increase) the braking force if the second distance TD2 is equal to or below the second traffic-state threshold TT2. The electronic controller 20C controls the braking device BD to change (e.g., increase) the braking force if the third distance TD3 is equal to or below the third traffic-state threshold TT3. The electronic controller 20C controls the braking device BD to change (e.g., increase) the braking force if the fourth distance TD4 is equal to or below the fourth traffic-state threshold TT4. The electronic controller 20C controls the braking device BD to change (e.g., increase) the braking force if the fifth distance TD5 is equal to or below the fifth traffic-state threshold TT5. The electronic controller 20C controls the braking device BD to change (e.g., increase) the braking force if the sixth distance TD6 is equal to or below the sixth traffic-state threshold TT6.

As seen in FIGS. 5 and 6, the electronic controller 20C controls the rider-posture changing device AS to change the state of the rider-posture changing device AS if one of the conditions is met in the steps S2 to S9 (step S14). At least one of all possible controls mentioned above regarding the rider-posture changing device AS can be executed in the step S14.

As seen in FIG. 6, for example, the electronic controller 20C controls the rider-posture changing device AS to change the state of the rider-posture changing device AS (e.g., from the lock state to the adjustable state) if the first distance TD1 is equal to or below the first traffic-state threshold TT1. The electronic controller 20C controls the rider-posture changing device AS to change the state of the rider-posture changing device AS (e.g., from the lock state to the adjustable state) if the second distance TD2 is equal to or below the second traffic-state threshold TT2. The electronic controller 20C controls the rider-posture changing device AS to change the state of the rider-posture changing device AS (e.g., from the lock state to the adjustable state) if the third distance TD3 is equal to or below the third traffic-state threshold TT3. The electronic controller 20C controls the rider-posture changing device AS to change the state of the rider-posture changing device AS (e.g., from the lock state to the adjustable state) if the fourth distance TD4 is equal to or below the fourth traffic-state threshold TT4. The electronic controller 20C controls the rider-posture changing device AS to change the state of the rider-posture changing device AS (e.g., from the lock state to the adjustable state) if the fifth distance TD5 is equal to or below the fifth traffic-state threshold TT5. The electronic controller 20C controls the rider-posture changing device AS to change the state of the rider-posture changing device AS (e.g., from the lock state to the adjustable state) if the sixth distance TD6 is equal to or below the sixth traffic-state threshold TT6.

As seen in FIGS. 5 and 6, the electronic controller 20C controls the light emitting device LE to change the state of the light emitting device LE if one of the conditions is met in the steps S2 to S9 (step S15). At least one of all possible controls mentioned above regarding the light emitting device LE can be executed in the step S15.

As seen in FIG. 6, for example, the electronic controller 20C controls the light emitting device LE to change the state of the light emitting device LE (e.g., from a non-lighting state to the predetermined state) if the first distance TD1 is equal to or below the first traffic-state threshold TT1. The electronic controller 20C controls the light emitting device LE to change the state of the light emitting device LE (e.g., from a non-lighting state to the predetermined state) if the second distance TD2 is equal to or below the second traffic-state threshold TT2. The electronic controller 20C controls the light emitting device LE to change the state of the light emitting device LE (e.g., from a non-lighting state to the predetermined state) if the third distance TD3 is equal to or below the third traffic-state threshold TT3. The electronic controller 20C controls the light emitting device LE to change the state of the light emitting device LE (e.g., from a non-lighting state to the predetermined state) if the fourth distance TD4 is equal to or below the fourth traffic-state threshold TT4. The electronic controller 20C controls the light emitting device LE to change the state of the light emitting device LE (e.g., from a non-lighting state to the predetermined state) if the fifth distance TD5 is equal to or below the fifth traffic-state threshold TT5. The electronic controller 20C controls the light emitting device LE to change the state of the light emitting device LE (e.g., from a non-lighting state to the predetermined state) if the sixth distance TD6 is equal to or below the sixth traffic-state threshold TT6. As seen in FIGS. 5 and 6, the process returns to the step S1 after the steps S10 to S15 are executed.

Figure 7:
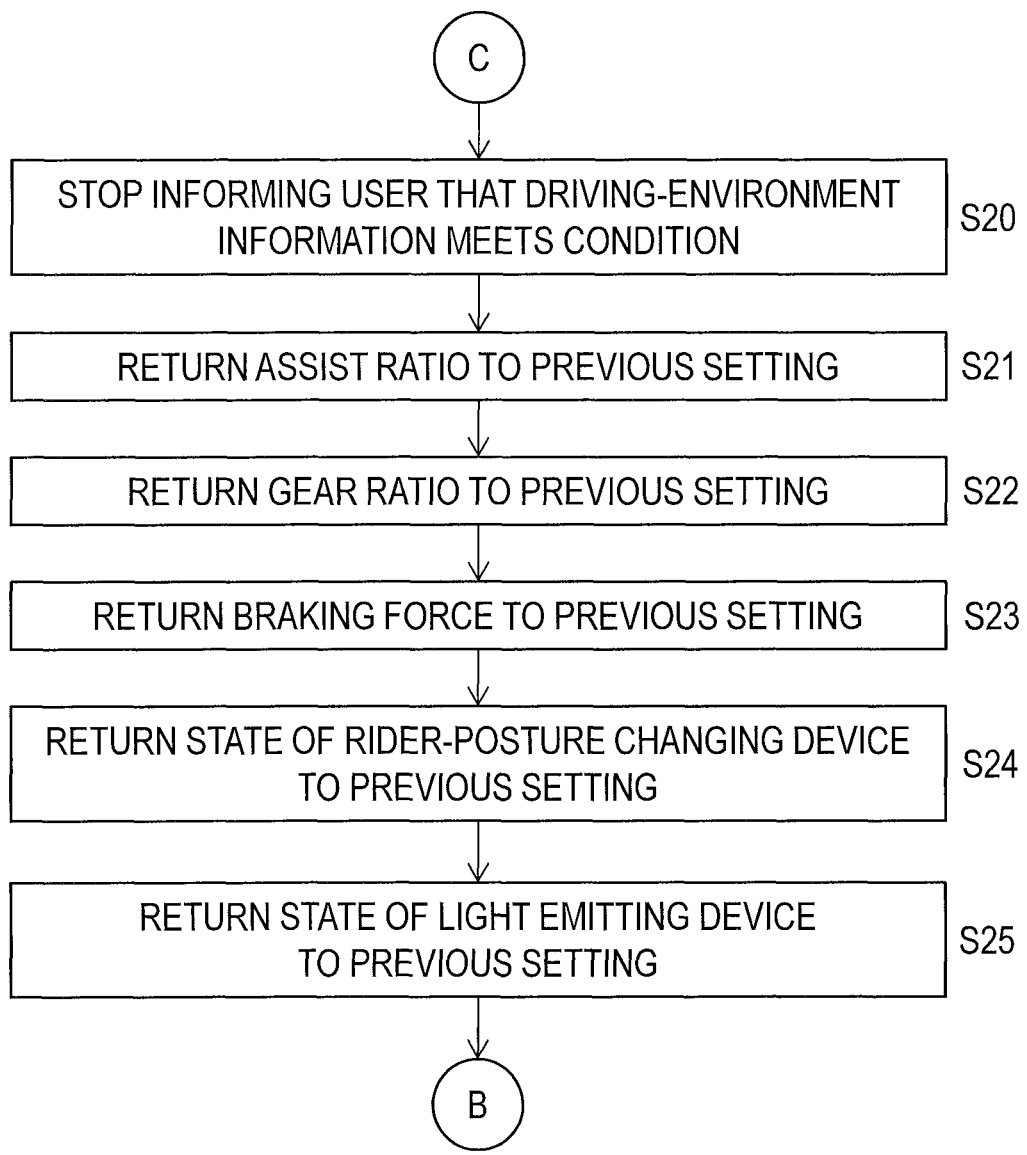

As seen in FIGS. 5 and 7, the process enters the step S20 if the conditions are not met in the steps S2 to S9. The electronic controller 20C controls the informing unit IU to stop informing the user that the driving-environment information meets the condition if conditions are not met in the steps S2 to S9 (step S20). The electronic controller 20C controls the assist driving unit DU to return the assist ratio to the previous setting if conditions are not met in the steps S2 to S9 (step S21). The electronic controller 20C controls the gear-changing device RD to return the gear ratio to the previous setting if conditions are not met in the steps S2 to S9 (step S22). The electronic controller 20C controls the braking device BD to return the braking force to the previous setting if conditions are not met in the steps S2 to S9 (step S23). The electronic controller 20C controls the rider-posture changing device AS to return the state of the rider-posture changing device AS to the previous setting if conditions are not met in the steps S2 to S9 (step S24). The electronic controller 20C controls the light emitting device LE to return the state of the light emitting device LE to the previous setting if conditions are not met in the steps S2 to S9 (step S25). As seen in FIGS. 5 and 7, the process returns to the step S1 after the steps S20 to S25 are executed.

In the present embodiment and the modifications thereof, the electronic controller 20C is configured to control the electric component EC based on the driving-environment information including both the traffic information and the road object information. However, the electronic controller 20C can be configured to control the electric component EC based on only one of the traffic information and the road object information if needed and/or desired. In a case where the electronic controller 20C is configured to control the electric component EC based on the traffic information without the road object information, the steps S8 and S9 are omitted from the flowchart depicted in FIG. 5. In a case where the electronic controller 20C is configured to control the electric component EC based on the road object information without the traffic information, the steps S2 and S7 are omitted from the flowchart depicted in FIG. 5.

In the present embodiment and the modifications thereof, the electronic controller 20C is configured to control the informing unit IU, the assist driving unit DU, the gear-changing device RD, the braking device BD, the rider-posture changing device AS, and the light emitting device LE based on the driving-environment information. However, at least one of the informing unit IU, the assist driving unit DU, the gear-changing device RD, the braking device BD, the rider-posture changing device AS, and the light emitting device LE can be omitted from the electric component EC if needed and/or desired.

In the present embodiment and the modifications thereof, the methods to control the electric component EC are not limited to the above-mentioned methods. The electronic controller 20C can be configured to control the electric component EC in accordance with methods different from the methods depicted in FIGS. 5 to 7.

In the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than two. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A control device for a human-powered vehicle, comprising:
    an electronic controller configured to obtain driving-environment information relating to driving environment of the human-powered vehicle, the driving-environment information including at least one of
        traffic information relating to traffic, and
        road object information relating to an object on a roadway,
    the electronic controller being configured to control an electric component based on the driving-environment information, wherein
    the electric component includes an adjustable seatpost configured to change a state of the adjustable seatpost between a lock state and an adjustable state in response to a user operation,
    the adjustable seatpost allows the user to change a position of a seat of the human-powered vehicle relative to a frame of the human-powered vehicle in the adjustable state, and the adjustable seatpost fixedly positions the seat relative to the frame in the lock state, and
    the electronic controller is configured to control the adjustable seatpost from the lock state to the adjustable state or from the adjustable state to the lock state based on the at least one of the traffic information relating to the traffic, and the road object information relating to the object on the roadway.

2. The control device according to claim 1, wherein
the electric component further includes at least one of an informing unit, an assist driving unit, a gear-changing device, a braking device, and a light emitting device, and
the electronic controller is configured to control the at least one of the informing unit, the assist driving unit, the gear-changing device, the braking device, and the light emitting device based on the driving-environment information.

3. The control device according to claim 1, wherein
the electric component includes an informing unit configured to inform a user that the driving-environment information meets a condition, and
the electronic controller is configured to control the informing unit to inform the user that the driving-environment information meets the condition if the driving-environment information meets the condition.

4. The control device according to claim 1, wherein
the electric component includes an assist driving unit, and
the electronic controller is configured to control the assist driving unit to change an assist ratio if the traffic information is equal to or below a traffic-state threshold, the assist ratio being a ratio of assist force applied by the assist driving unit to pedaling force applied by a user.

5. The control device according to claim 4, wherein
the electronic controller is configured to control the assist driving unit to decrease the assist ratio if the traffic information is equal to or below the traffic-state threshold.

6. The control device according to claim 1, wherein
the electric component includes an assist driving unit, and
the electronic controller is configured to control the assist driving unit to change an assist ratio if a road object distance defined from the control device to the object on the roadway and which is within a predetermined distance from the control device is equal to or below a road object threshold, the assist ratio being a ratio of assist force applied by the assist driving unit to pedaling force applied by a user.

7. The control device according to claim 6, wherein
the electronic controller is configured to control the assist driving unit to decrease the assist ratio if the road object distance is equal to or below the road object threshold.

8. The control device according to claim 1, wherein
the electric component includes a gear-changing device, and
the electronic controller is configured to control the gear-changing device to change a gear ratio if the traffic information is equal to or below a traffic-state threshold.

9. The control device according to claim 8, wherein
the electronic controller is configured to control the gear-changing device to downshift if the traffic information is equal to or below the traffic-state threshold.

10. The control device according to claim 1, wherein
the electric component includes a gear-changing device, and
the electronic controller is configured to control the gear-changing device to change a gear ratio if a road object distance defined from the control device to the object on the roadway and which is within a predetermined distance from the control device is equal to or below a road object threshold.

11. The control device according to claim 10, wherein
the electronic controller is configured to control the gear-changing device to downshift if the road object distance is equal to or below the road object threshold.

12. The control device according to claim 1, wherein
the electric component includes a braking device, and
the electronic controller is configured to control the braking device to change braking force if the traffic information is equal to or below a traffic-state threshold.

13. The control device according to claim 12, wherein
the electronic controller is configured to control the braking device to increase the braking force if the traffic information is equal to or below the traffic-state threshold.

14. The control device according to claim 1, wherein
the electric component includes a braking device, and
the electronic controller is configured to control the braking device to change braking force if a road object distance defined from the control device to the object on the roadway and which is within a predetermined distance from the control device is equal to or below a road object threshold.

15. The control device according to claim 14, wherein
the electronic controller is configured to control the braking device to increase the braking force if the road object distance is equal to or below the road object threshold.

16. The control device according to claim 1, wherein
the electronic controller is configured to control the adjustable seatpost to change a state of the adjustable seatpost if the traffic information is equal to or below a traffic-state threshold.

17. The control device according to claim 16, wherein
the electronic controller is configured to control the adjustable seatpost to change the state of the adjustable seatpost to a predetermined state if the traffic information is equal to or below the traffic-state threshold.

18. The control device according to claim 1, wherein
the electronic controller is configured to control the adjustable seatpost to change a state of the adjustable seatpost if a road object distance defined from the control device to the object on the roadway and which is within a predetermined distance from the control device is equal to or below a road object threshold.

19. The control device according to claim 18, wherein
the electronic controller is configured to control the adjustable seatpost to change the state of the adjustable seatpost to a predetermined state if the road object distance is equal to or below the road object threshold.

20. The control device according to claim 1, wherein
the electric component includes a light emitting device, and
the electronic controller is configured to control the light emitting device to change a state of the light emitting device if a road object distance defined from the control device to the object on the roadway and which is within a predetermined distance from the control device is equal to or below a road object threshold.

21. The control device according to claim 20, wherein
the electronic controller is configured to control the light emitting device to change the state of the light emitting device to a predetermined state if the road object distance is equal to or below the road object threshold.

22. The control device according to claim 1, wherein
the electronic controller is configured to obtain the driving-environment information from an external device.

23. The control device according to claim 1, wherein
the traffic information includes at least one of
vehicular traffic data,
motorcycle traffic data,
human-powered vehicle traffic data,
pedestrian traffic data,
road surface condition data, and
occurrence data.

24. The control device according to claim 23, wherein
the occurrence data includes physical contact data relating to physical contacts between entities selected from among at least two of vehicles, motorcycles, human-powered vehicles, pedestrians, and road objects.

25. The control device according to claim 1, wherein
the traffic information includes past and present traffic data obtained from a traffic infrastructure system.

26. The control device according to claim 1, wherein
the road object information relates to at least one of
non-living objects which are on roadways, and
living objects put which are on roadways.

27. The control device according to claim 1, further comprising
a detector, wherein
the electronic controller is configured to obtain the driving-environment information based on a detection result of the detector.

28. An electronic controller configured to obtain driving-environment information relating to driving environment of the human-powered vehicle, the driving-environment information including at least one of
traffic information relating to traffic, and
road object information relating to an object on a roadway,
the electronic controller being configured to control an electric component based on the driving-environment information, wherein
the electric component includes an adjustable seatpost configured to change a state of the adjustable seatpost between a lock state and an adjustable state in response to a user operation,
the adjustable seatpost allows the user to change a position of a seat of the human-powered vehicle relative to a frame of the human-powered vehicle in the adjustable state, and the adjustable seatpost fixedly positions the seat relative to the frame in the lock state, and
the electronic controller is configured to control the adjustable seatpost from the lock state to the adjustable state or from the adjustable state to the lock state based on the at least one of the traffic information relating to the traffic, and the road object information relating to the object on the roadway.

29. A control device for a human-powered vehicle, comprising:
an electronic controller configured to obtain driving-environment information relating to driving environment of the human-powered vehicle, the driving-environment information including traffic information relating to traffic,
the electronic controller being configured to control an electric component based on the driving-environment information, wherein
the electric component includes a gear-changing device, the electronic controller is configured to control the gear-changing device to shift gears to change a gear ratio if the traffic information is equal to or below a traffic-state threshold, and the electronic controller is configured to control the gear-changing device to downshift if the traffic information is equal to or below the traffic-state threshold.

* * * * *